United States Patent
Hasegawa et al.

(10) Patent No.: US 9,151,929 B2
(45) Date of Patent: Oct. 6, 2015

(54) IMAGE PICKUP APPARATUS AND LENS UNIT

(71) Applicant: CANON KABUSHIKI KAISHA, Tokyo (JP)

(72) Inventors: Takashi Hasegawa, Tokyo (JP); Tatsuyuki Tokunaga, Saitama (JP); Tetsuya Nishio, Kawasaki (JP); Azusa Sugawara, Yokohama (JP); Hiroshi Kikuchi, Zushi (JP); Yoshihiko Konno, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/856,581

(22) Filed: Apr. 4, 2013

(65) Prior Publication Data

US 2013/0265657 A1    Oct. 10, 2013

(30) Foreign Application Priority Data

Apr. 4, 2012  (JP) .................................. 2012-085190
Apr. 4, 2012  (JP) .................................. 2012-085223
Apr. 4, 2012  (JP) .................................. 2012-085426
Mar. 12, 2013 (JP) .................................. 2013-049118

(51) Int. Cl.
*G03B 17/00* (2006.01)
*G02B 9/00* (2006.01)
(Continued)

(52) U.S. Cl.
CPC .. *G02B 9/00* (2013.01); *G02B 9/04* (2013.01); *G02B 9/12* (2013.01); *G02B 9/34* (2013.01);
(Continued)

(58) Field of Classification Search
USPC ........................................................ 396/532
See application file for complete search history.

(56) References Cited

U.S. PATENT DOCUMENTS

| 4,737,812 A | 4/1988 | Hasegawa et al. |
| 6,041,189 A * | 3/2000 | Izukawa ................. 396/277 |

(Continued)

FOREIGN PATENT DOCUMENTS

| JP | 59-048742 A | 3/1984 |
| JP | 62-032426 A | 2/1987 |

(Continued)

OTHER PUBLICATIONS

The above patent documents were cited in a Partial European Search Report issued on Dec. 9, 2013, which is enclosed, that issued in the corresponding European Patent Application No. 13162290.4.

(Continued)

*Primary Examiner* — Clayton E Laballe
*Assistant Examiner* — Dennis Hancock
(74) *Attorney, Agent, or Firm* — Cowan, Liebowitz & Latman, P.C.

(57) ABSTRACT

A first lens unit performing communication with an image pickup apparatus with a first voltage and a second lens unit performing communication with the image pickup apparatus with a second voltage are selectively attached to the image pickup apparatus. The image pickup apparatus includes a controller configured to operate with a third voltage different from at least one of the first and second voltages to output a signal for the communication with the first and second lens units, and a determiner configured to determine the type of the lens unit attached to the image pickup apparatus. The controller is configured to produce, as a voltage of the signal for the communication, from the third voltage, one of the first and second voltages corresponding to a determination result of the determiner.

22 Claims, 13 Drawing Sheets

(51) Int. Cl.

| | | |
|---|---|---|
| *G02B 9/12* | (2006.01) | |
| *G02B 9/34* | (2006.01) | |
| *G02B 9/60* | (2006.01) | |
| *G02B 9/62* | (2006.01) | |
| *G02B 9/64* | (2006.01) | |
| *G02B 9/04* | (2006.01) | |
| *G03B 17/14* | (2006.01) | |

(52) U.S. Cl.
  CPC .. *G02B 9/60* (2013.01); *G02B 9/62* (2013.01); *G02B 9/64* (2013.01); *G03B 17/14* (2013.01); *G03B 2206/00* (2013.01)

(56) References Cited

U.S. PATENT DOCUMENTS

| | | | |
|---|---|---|---|
| 2004/0046890 | A1 | 3/2004 | Kikuchi et al. |
| 2007/0126871 | A1* | 6/2007 | Henninger et al. ........... 348/151 |
| 2012/0063016 | A1* | 3/2012 | Imafuji et al. ................ 359/822 |

FOREIGN PATENT DOCUMENTS

| | | | |
|---|---|---|---|
| JP | 62-195633 | A | 8/1987 |
| JP | 02-222934 | A | 9/1990 |
| JP | 07-043773 | A | 2/1995 |
| JP | 07-114087 | A | 5/1995 |
| JP | 09-090488 | A | 4/1997 |
| JP | 11-346435 | A | 12/1999 |
| JP | 2000-047308 | A | 2/2000 |
| JP | 2002-341424 | A | 11/2002 |
| JP | 2004-069990 | A | 3/2004 |
| JP | 2004-117380 | A | 4/2004 |
| JP | 2005-157001 | A | 6/2005 |
| JP | 2007-171506 | A | 7/2007 |
| JP | 2009-093122 | A | 4/2009 |
| WO | 2009-048074 | A1 | 4/2009 |

OTHER PUBLICATIONS

European Search Report issued on Jan. 27, 2015, corresponding European Patent Application No. 13162290.4.

Jun. 30, 2015 Chinese Office Action, issued in Chinese Patent Application No. 201310120138.0.

* cited by examiner

IMAGE PICKUP APPARATUS AND LENS UNIT

BACKGROUND OF THE INVENTION

1. Field of the Invention

The present invention relates to an image pickup apparatus and a lens unit interchangeably attachable to the image pickup apparatus such as an interchangeable lens.

2. Description of the Related Art

Such a lens unit receives, in a state of being attached to an image pickup apparatus (hereinafter referred to as "a camera"), power supplied from the camera and performs communication of commands, data and others with the camera. However, lens units of different types often operate with different operation voltages.

Japanese Patent Laid-Open Nos. 07-043773 and 2009-93122 disclose cameras to which multiple types of interchangeable lenses that operate with different operation voltages are attachable. Specifically, the camera disclosed in Japanese Patent Laid-Open No. 07-043773 is provided with multiple power sources capable of supplying source voltages respectively corresponding to the operation voltages of the multiple types of interchangeable lenses. On the other hand, the camera disclosed in Japanese Patent Laid-Open No. 2009-93122 is provided with a circuit capable of producing source voltages (that is, capable of changing a producing voltage) respectively corresponding to the operation voltages of the multiple types of interchangeable lenses.

However, the camera disclosed in Japanese Patent Laid-Open No. 07-043773 has a problem that its size becomes large because of being provided with the multiple power sources having large capacities for supplying the source voltages to the multiple types of interchangeable lenses.

Moreover, the camera disclosed in Japanese Patent Laid-Open No. 07-043773 determines the type of the interchangeable lens attached thereto on a basis of whether or not the interchangeable lens operates by a lower one of the multiple (two) source voltages (V1 and V2 lower than V1). However, the determination requires that the interchangeable lens originally operating with the source voltage V2 cannot operate with the lower source voltage V1. In other words, there is a restricted relationship between the source voltages V1 and V2. If the camera erroneously determines that the attached interchangeable lens originally operating with the source voltage V1 is one operating with the source voltage V2, the attached interchangeable lens receives, from the camera, the source voltage V2 exceeding its rated source voltage or a source current exceeding its rated source current, which causes performance deterioration or failure of the attached interchangeable lens.

On the other hand, the camera disclosed in Japanese Patent Laid-Open No. 2009-93122 determines the type of the attached interchangeable lens on a basis of a reference voltage output from the interchangeable lens to the camera. Therefore, there is no restricted relationship between the source voltages of the interchangeable lenses such as the restricted relationship between the source voltages V1 and V2 in the camera disclosed in Japanese Patent Laid-Open No. 07-043773. However, the camera disclosed in Japanese Patent Laid-Open No. 2009-93122 requires the circuit for changing the source voltage to be supplied to the attached interchangeable lens, which also increases the size of the camera. In addition, the camera is also likely to erroneously determine the type of the attached interchangeable lens, and thereby supplies, to the attached interchangeable lens, the source voltage exceeding its rated source voltage.

BRIEF SUMMARY OF THE INVENTION

The present invention provides an image pickup apparatus enabling communication with multiple types of lens units whose communication voltages are different from one another without changing a source voltage to be supplied from the image pickup apparatus to the attached lens unit, and provides a lens unit attachable to the image pickup apparatus.

The present invention provides as one aspect thereof an image pickup apparatus to which a plurality of types of lens units are selectively attachable. The plurality of types of lens units include a first lens unit that performs communication with the image pickup apparatus with a first voltage and a second lens unit that performs communication with the image pickup apparatus with a second voltage different from the first voltage. The image pickup apparatus includes a controller configured to operate with a third voltage different from at least one of the first and second voltages to output a signal for the communication with the first and second lens units, and a determiner configured to determine the type of the lens unit attached to the image pickup apparatus. The controller is configured to produce, as a voltage of the signal for the communication, from the third voltage, one of the first and second voltages corresponding to a determination result of the determiner.

The present invention provides as another aspect thereof a lens unit included in a plurality of types of lens units selectively attachable to an image pickup apparatus that sets a communication voltage corresponding to the type of the lens unit attached thereto and performs communication with the attached lens unit with the communication voltage. The lens unit includes a mount to mechanically couple with the image pickup apparatus and to electrically connect the lens unit with the image pickup apparatus, and a lens controller configured to receive power supply at a fourth voltage from the image pickup apparatus, to produce from the fourth voltage a sixth voltage different from the fourth voltage, and to perform the communication with the image pickup apparatus with the sixth voltage. The mount includes a first lens terminal connected with a second resistance having a predetermined resistance value, thereby enabling the image pickup apparatus to determine the type of the lens unit attached thereto and to set the communication voltage for the attached lens unit on a basis of a determination result of the type of the attached lens unit.

The present invention provides as still another aspect thereof a lens unit included in a plurality of types of lens units selectively attachable to an image pickup apparatus that sets a communication voltage corresponding to the type of the lens unit attached thereto and performs communication with the attached lens unit with the communication voltage. The lens unit includes a mount to mechanically couple with the image pickup apparatus and to electrically connect the lens unit with the image pickup apparatus, and a lens controller configured to receive power supply at a fourth voltage from the image pickup apparatus, to produce from the fourth voltage a sixth voltage different from the fourth voltage, and to perform the communication with the image pickup apparatus with the sixth voltage. The mount includes a first lens terminal to output a predetermined voltage corresponding to the type of the lens unit in a state of being attached to the image pickup apparatus, thereby enabling the image pickup apparatus to determine the type of the lens unit attached thereto and to set the communication voltage for the attached lens unit on a basis of a determination result of the type of the attached lens unit.

The present invention provides as yet still another aspect thereof a lens unit including a mount to mechanically couple with the image pickup apparatus and to electrically connect the lens unit with the image pickup apparatus, and a lens controller configured to receive power supply at a fourth voltage from the image pickup apparatus, to produce from the fourth voltage a sixth voltage different from the fourth voltage, and to perform the communication with the image pickup apparatus with the sixth voltage. The mount includes a first lens terminal enabling provision of the type of the lens unit by a configuration connected with a second resistance having a predetermined resistance value corresponding to the type of the lens unit.

The present invention provides as further another aspect thereof a lens unit including a mount to mechanically couple with the image pickup apparatus and to electrically connect the lens unit with the image pickup apparatus, and a lens controller configured to receive power supply at a fourth voltage from the image pickup apparatus, to produce from the fourth voltage a sixth voltage different from the fourth voltage, and to perform the communication with the image pickup apparatus with the sixth voltage. The mount includes a first lens terminal enabling provision of the type of the lens unit by a configuration to output a predetermined voltage corresponding to the type of the lens unit in a state of being attached to the image pickup apparatus.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 1A:
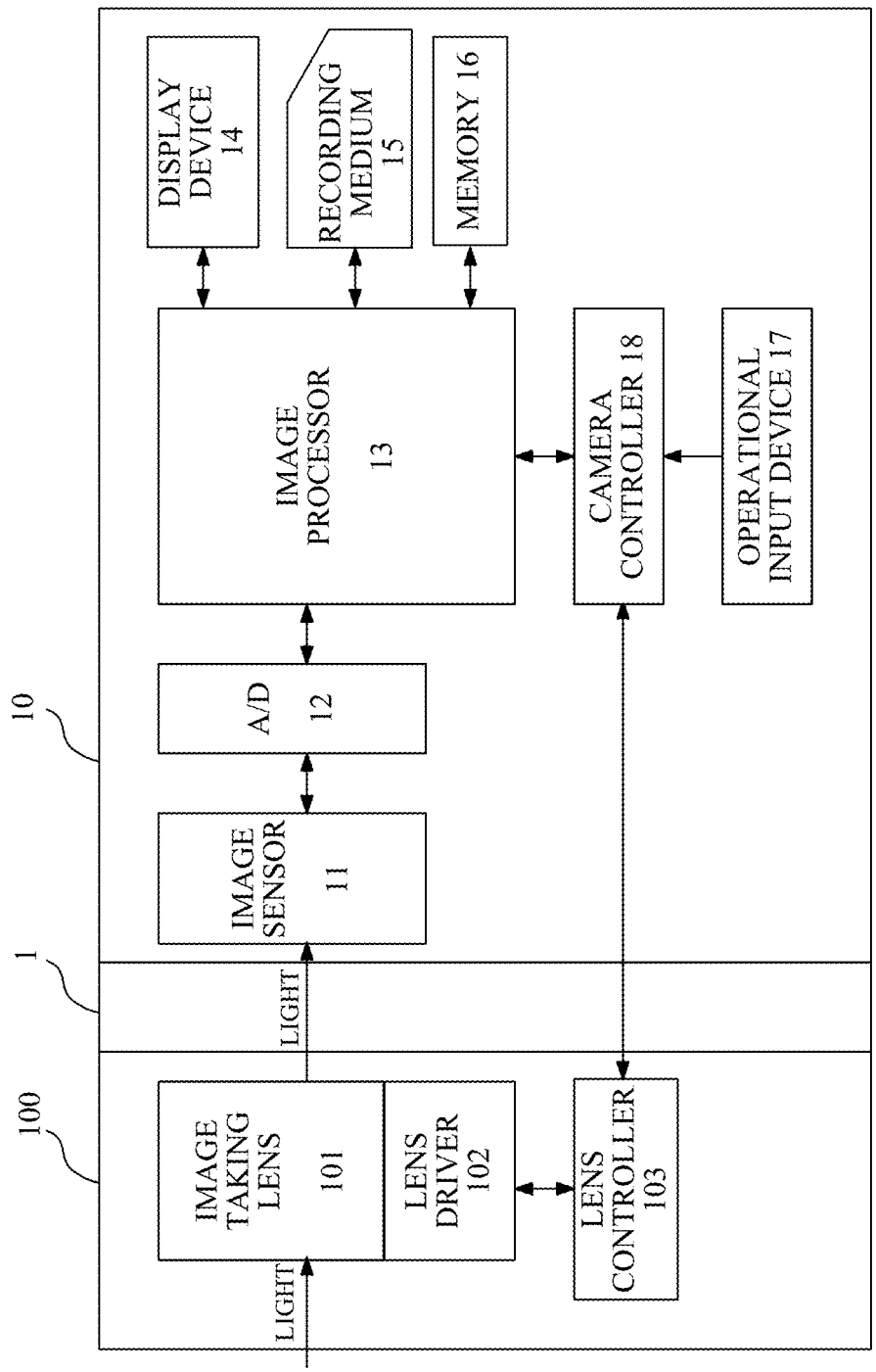
FIGS. 1A and 1B are block diagrams showing a configuration of a camera system including a camera and an interchangeable lens that are Embodiment 1 of the present invention.

FIG. 1A shows an interchangeable lens 100 as a lens unit and a camera 10 as an image pickup apparatus to which the interchangeable lens 100 is detachably (that is, interchangeably) attachable, which are Embodiment 1 of the present invention and constitute a camera system. The camera 10 and the interchangeable lens 100 each have a mount 1 that mechanically couples and electrically connects the camera 10 and the interchangeable lens 100. The mount includes electrical an electrical contacts for supplying source power from the camera 10 to the interchangeable lens 100 and for performing communication therebetween.

The camera 10 includes an image sensor (image pickup element) 11 that photoelectrically converts an object image as an optical image formed by an image taking lens 101 housed in the interchangeable lens 100 and outputs an analog electrical signal. Moreover, the camera 10 includes an A/D converter 12 that converts the analog electrical signal output from the image sensor 11 into a digital signal and an image processor 13 that performs various image processes on the digital signal to produce an image signal. The image signal (still image or video) produced by the image processor 13 is displayed on a display device 14 or recorded in a recording medium 15.

The camera 10 further includes a memory 16 that serves as a buffer for performing the process on the image signal and stores operation programs to be used by a camera controller 18 described later. The camera 10 is additionally provided with an operational input device 17 that includes a power switch for switching power on and off, an image capturing switch for starting recording of the image signal and a selection/setting switch for performing setting in various menus. The camera controller 18 including a microcomputer controls the image processor 13 according to signals from the operational input device 17 and controls communication with the interchangeable lens 100.

On the other hand, the interchangeable lens 100 includes a lens driver 102 that drives actuators to move a focus lens, a zoom lens, an aperture stop and an image stabilizing lens included (but not shown) in the image taking lens 101. The interchangeable lens 100 is further provided with a lens controller (lens side controller) 103 that includes a microcomputer and controls the lens driver 102 according to control signals from the camera controller 18 through the communication.

Figure 1B:
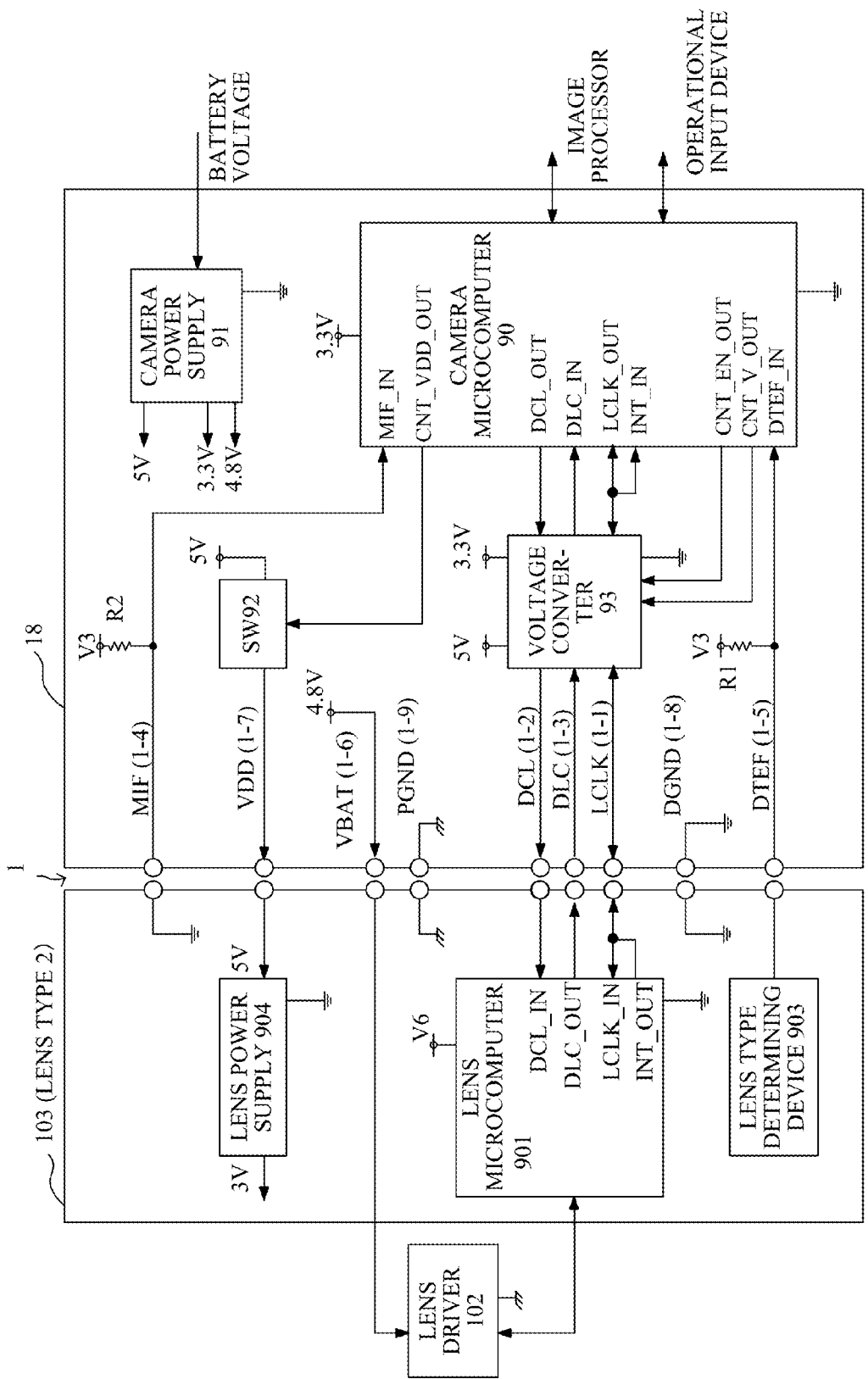

FIG. 1B shows terminals provided in the mount for electrical connection of the camera 10 (camera controller 18) and the interchangeable lens 100 (lens controller 103).

An LCLK terminal (1-1) is a terminal for a communication clock signal output from the camera 10 to the interchangeable lens 100. A DCL terminal (1-2) is a terminal for communication data output from the camera 10 to the interchangeable lens 100. A DLC terminal (1-3) is a terminal for communication data output from the interchangeable lens 100 to the camera 10. The LCLK terminal, the DCL terminal and the DLC terminal each correspond to a seventh terminal and a seventh lens side terminal.

An MIF terminal (1-4) is a terminal (sixth terminal and sixth lens side terminal) for detecting attachment of the interchangeable lens 100 to the camera 10. The microcomputer (hereinafter referred to as "a camera microcomputer") 90 in the camera controller 18 detects that the interchangeable lens 100 is attached to the camera 10 on a basis of a voltage of the MIF terminal.

A DTEF terminal (1-5) is a terminal (first terminal) for detecting type of the interchangeable lens 100 attached to the camera 10. The camera microcomputer 90 detects (determines) the type of the interchangeable lens 100 attached to the camera 10 on a basis of a voltage of the DTEF terminal.

A VBAT terminal (1-6) is a terminal (fourth terminal and fourth lens side terminal) for supplying driving source power (VM) from the camera 10 to the interchangeable lens 100; the driving source power is used for various operations of the interchangeable lens 100 such as drive of various actuators, except communication control. A VDD terminal (1-7) is a terminal (second terminal) for supplying communication controlling source power (VDD) from the camera 10 to the interchangeable lens 100; the communication controlling source power is used for communication control in the interchangeable lens 100. The VBAT terminal is provided separately from the VDD terminal. This is because sharing of a same terminal by the VBAT terminal and the VDD terminal may increase electrical current flowing through the terminal due to a heavy load caused by drive of the actuator or the like, which may affect operation of the microcomputer. A DGND terminal (1-8) is a terminal (third terminal and third lens side terminal) for connecting a communication control system of the camera 10 and interchangeable lens 100 to ground. That is, the DGND terminal is provided as a grounding terminal provided along with the VDD terminal. A PGND terminal (1-9) is a terminal (fifth terminal and fifth lens side terminal) for connecting a mechanical drive system including the actuator such as a motor, which is provided in each of the camera 10 and the interchangeable lens 100, to the ground. In other words, the PGND terminal is provided as a grounding terminal along with the VBAT terminal.

Multiple types of interchangeable lenses are selectively attached to the camera 10 of this embodiment; the interchangeable lenses perform communication with the camera with different communication voltages from one another. Description will hereinafter be made of a case where the types of the interchangeable lenses that are identified by the camera 10 on the basis of the voltage of the DTEF terminal includes a first interchangeable lens and a second interchangeable lens whose communication voltage is different from that of the first interchangeable lens. The first interchangeable lens corresponds to a first lens unit, and the second interchangeable lens corresponds to a second lens unit. A detailed description of the communication voltage will be made later.

In this embodiment, the first interchangeable lens uses 5V as its communication voltage, and the second interchangeable lens uses 3V as its communication voltage. The first interchangeable lens can switch its communication method between an open drain method with a relatively low speed of about tens of KHz and a CMOS communication method with a relatively high speed from hundreds of KHz to several MHz. Specifically, the first interchangeable lens performs an initial communication by the open drain method in response to the attachment thereof to the camera, and then switches the communication method to the CMOS communication method in response to establishment of the communication with the camera to perform high-speed communication therewith. On the other hand, the second interchangeable lens uses only the CMOS communication method. A lower communication voltage is more advantageous for increase of communication speed.

A camera power supply 91 provided in the camera controller 18 converts a battery voltage supplied from a battery (not shown) included in the camera 10 into voltages necessary for operations of respective circuits in the camera 10. Specifically, the camera power supply 91 produces voltages V1, V3 and VM.

First, description of the voltages that are output from the camera power supply 91 shown in FIG. 1B will be made. A voltage of 5V as a first voltage (V1) is used as the communication voltage of the first interchangeable lens. The voltage of 5V is also used, as a fourth voltage (VDD), as the communication controlling source power of the first and second interchangeable lenses. A voltage of 3V as a second voltage (V2) is used as the communication voltage of the second interchangeable lens, which is produced by a voltage converter 93 as described in detail later. A voltage of 3.3V as a third voltage (V3) is used as an operation source voltage of the camera microcomputer 90. A voltage of 4.8V as a fifth voltage (VM) is uses as the driving source voltage of the actuators provided in the first and second interchangeable lenses. The first voltage V1 is different from the second voltage V2. On the other hand, the voltage V1 may be same as the voltage V3 or VM, and the voltage V2 may be same as the voltage V3 or VM. In other words, it is only necessary that the third voltage V3 is different from at least one of the first and second voltages V1 and V2 (the third voltage V3 may be different from both the first and second voltages V1 and V2).

In response to turn-on of the above-mentioned power switch 92, the camera microcomputer 90 starts supply of the VDD and VM from the camera 10 to the interchangeable lens 100. In response to turn-off of the power switch 92, the camera microcomputer 90 ends the supply of the VDD and VM from the camera 10 to the interchangeable lens 100.

The camera microcomputer 90 performs communication with the interchangeable lens 100 through the voltage converter 93. The camera microcomputer 90 has an LCLK_OUT terminal for outputting a communication clock signal, a DCL_OUT terminal for sending communication data to the interchangeable lens 100 and a DLC_IN terminal for receiving communication data from the interchangeable lens 100. The communication clock signal and the communication data each correspond to a signal for communication. The camera microcomputer 90 serves as a camera communicating device.

Moreover, the camera microcomputer 90 has an MIF_IN terminal for detecting the attachment of the interchangeable lens 100 to the camera 10, a DTEF_IN terminal for identifying the type of the attached interchangeable lens 100 and a CNT_V_OUT terminal for outputting a communication voltage switching signal to the voltage converter 93. The camera microcomputer 90 serves as a determiner. Operation of the voltage converter 93 will be described below.

In addition, the camera microcomputer 90 further has a CNT_VDD_OUT terminal for outputting a current-applying signal to the power switch 92, a connection terminal connected with the image processor 13 and another connection terminal connected with the operational input device 17.

A lens power supply 904 as a voltage producing device converts the VDD (5V) as the fourth voltage supplied from the camera 10 to the interchangeable lens 100 through the second terminal (second lens side terminal in the lens side mount) into a sixth voltage (V6). This sixth voltage (V6) is, as described in detail below, one of the first and second voltages (V1 and V2) which corresponds to the type of the interchangeable lens determined by the camera microcomputer 90. In FIG. 1B, since the second interchangeable lens is attached, as the interchangeable lens 100, to the camera 10, the sixth voltage is 3V corresponding to the second voltage (V2).

A microcomputer (hereinafter referred to as "a lens microcomputer") 901 provided in the lens controller 103 performs communicates with the camera microcomputer 90 through the above-mentioned voltage converter 93. The lens microcomputer 901 has an LCLK_IN terminal for receiving the communication clock signal, a DLC_OUT terminal for sending the communication data to the camera 10, a DCL_IN terminal for receiving the communication data from the camera 10 and a connection terminal connected with the lens driver 102. The lens microcomputer 901 serves as a lens communicating device.

The camera microcomputer 90 further has an INT_IN terminal for receiving an interrupt signal from the interchangeable lens 100 and a CNT_EN_OUT terminal for outputting a switching signal to switch the communication method with the interchangeable lens 100.

The lens microcomputer 901 further has an INT_OUT terminal for outputting the interrupt signal to the camera 10. This interrupt signal is periodically and time-divisionally output and received in a predetermined communication period through the LCLK terminal (1-1) of the mount 1.

Next, description will be made of a configuration of a camera side connector including camera side contact pins constituting camera side ones of the above-described terminals provided in the mount 1 and a lens side connector including lens side contact patterns (accessory side contact surfaces) constituting lens side ones thereof in the mount 1.

Figure 10A:
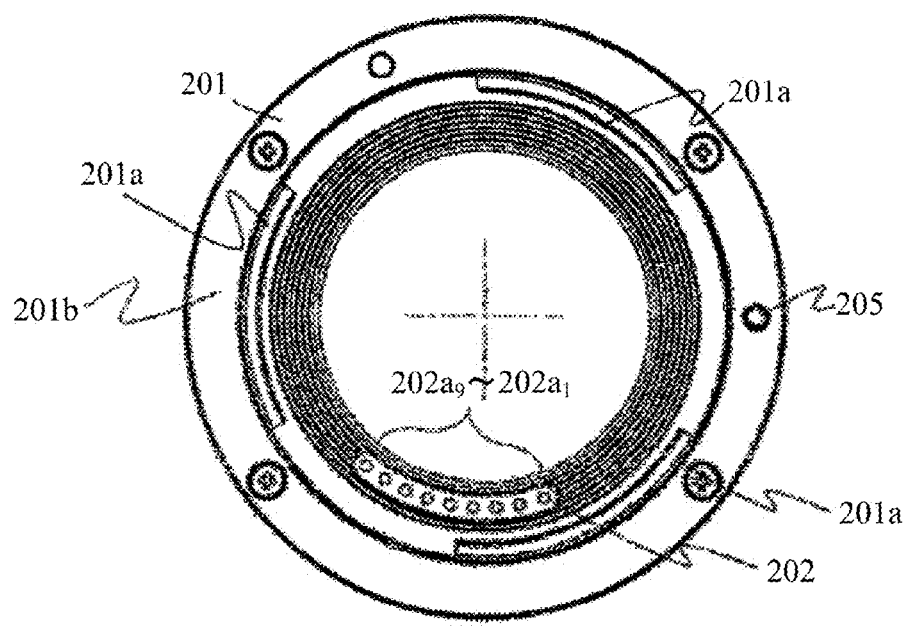
FIGS. 10A and 10B show configurations of mounts and connectors, which are provided in the camera and interchangeable lens of Embodiment 1.
Figure 10B:
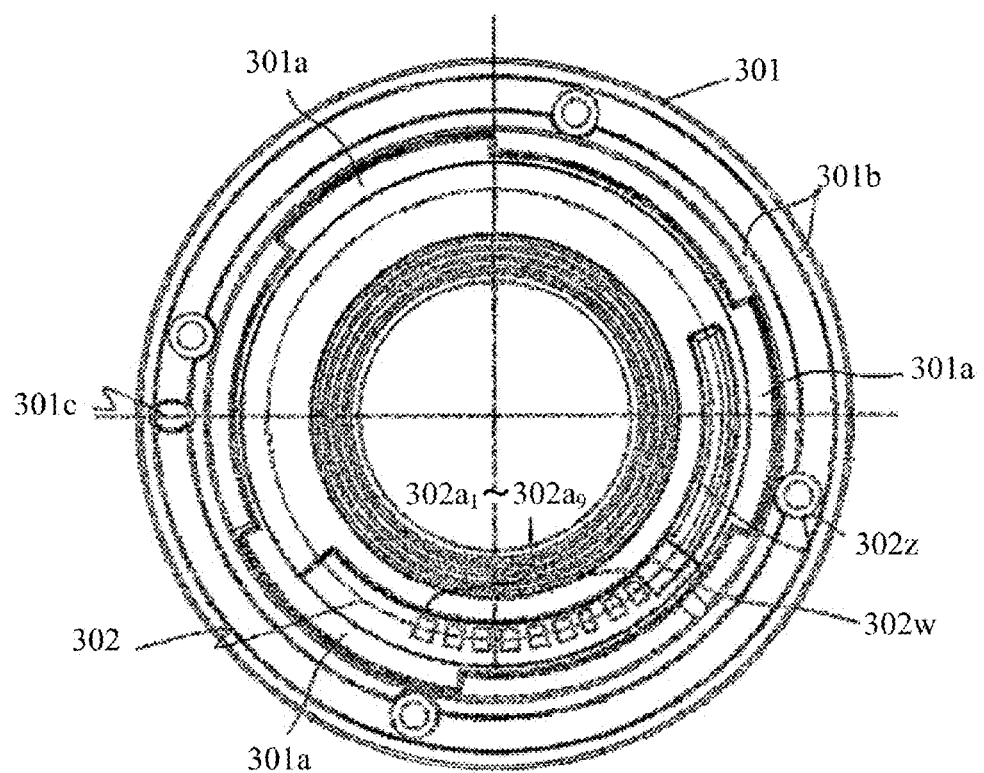
Figure 11A:
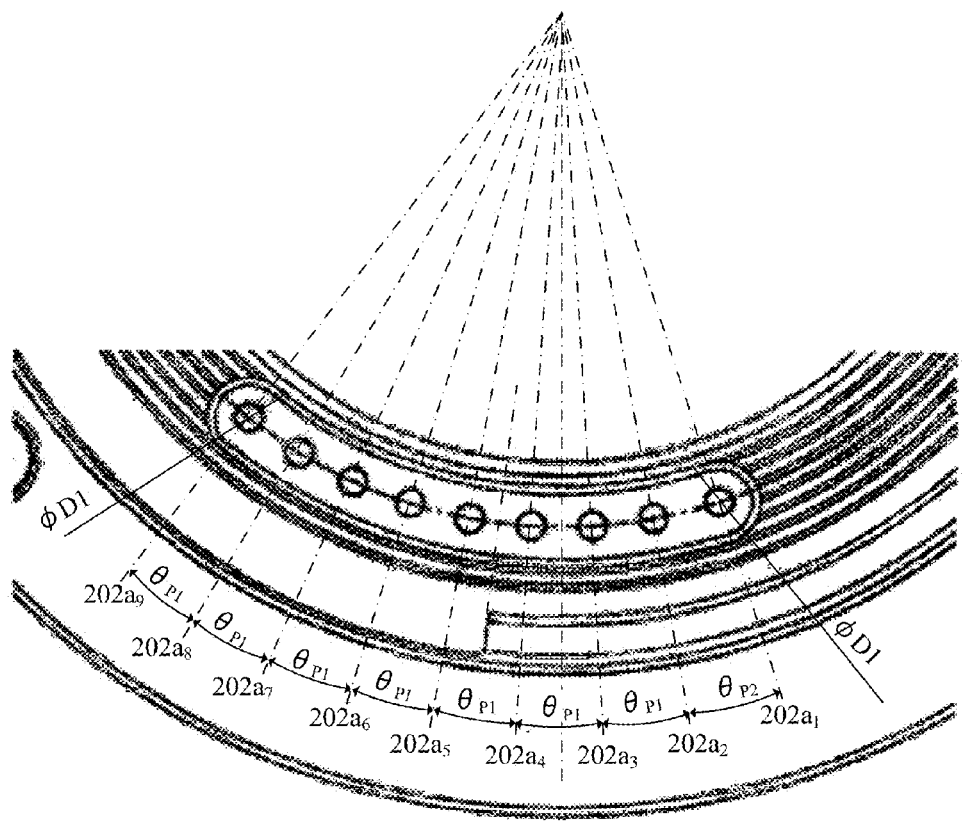
FIGS. 11A and 11B are enlarged views of the connectors.
Figure 11B:
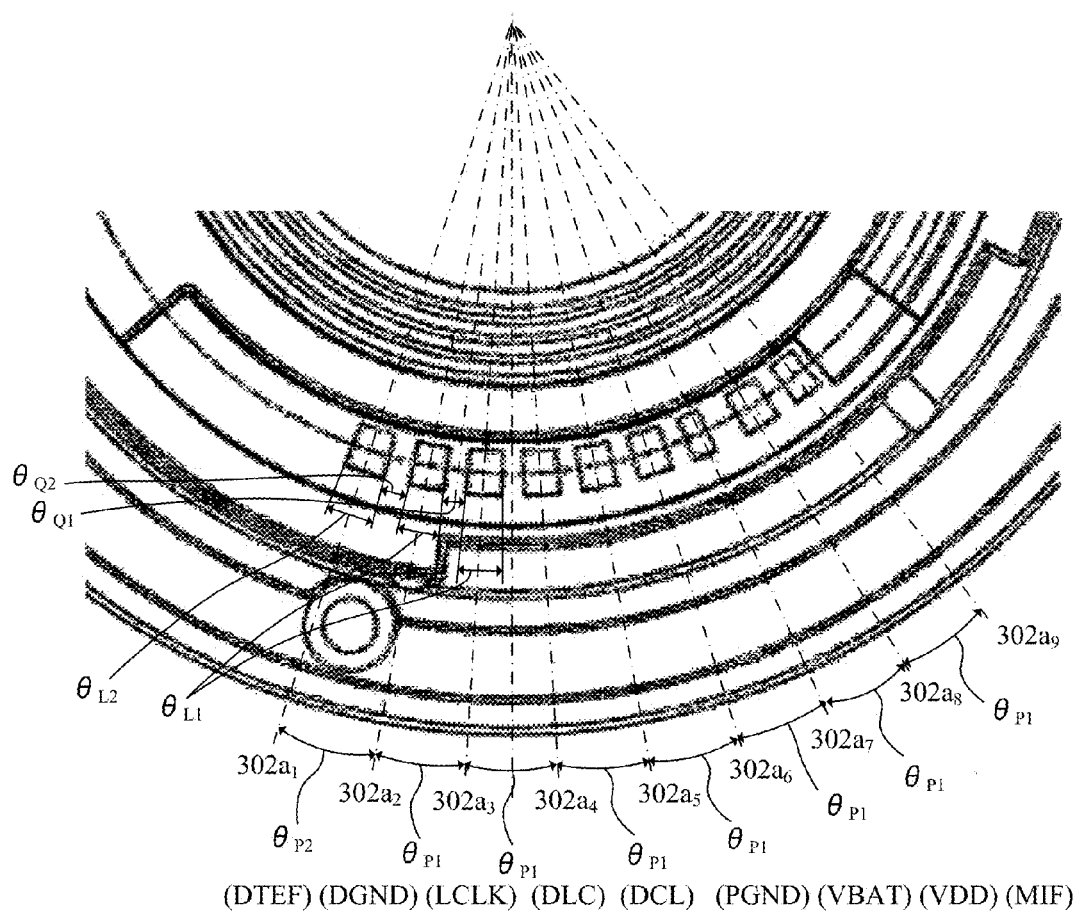

FIG. 10A shows a camera side mount 201 viewed from a front side (object side) in an optical axis direction corresponding to a direction in which an optical axis of the image taking lens 101 extends. FIG. 11A is an enlarged view showing the camera side connector (constituted by a camera side contact base 202 and the camera side contact pins $202a_1$ to $202a_9$) provided in the camera side mount 201. FIG. 10B shows a lens side mount 301 viewed from a rear side (image plane side) in the optical axis direction. FIG. 11B is an enlarged view showing the lens side connector (constituted by a lens side contact base 302 and the lens side contact patterns $302a_1$ to $302a_9$) provided in the lens side mount 301.

The camera side mount 201 is fixed at a front end portion of a camera body (not shown) as a chassis. The camera side mount 201 has, at its outer circumference side front end, a ring-shaped mount base surface 201b provided for securing a predetermined flange back, and also has, further inside than the mount base surface 201b at three places in its circumferential direction (hereinafter referred to as "a mount circumferential direction"), camera side bayonet claws 201a. Moreover, the camera side mount 201 is provided with a lock pin 205 for positioning of the camera side mount 201 and the lens side mount 301 in their relative rotational direction; the lock pin 205 is movable so as to protrude and retract with respect to the mount base surface 201b. The lens side mount (accessory side mount) 301 is fixed to a rear end portion (not shown) of the interchangeable lens. The lens side mount 301 has, at its outer circumferential side rear end portion, a mount base surface 301b that is a reference surface in the optical axis direction, and has, further inside than the mount base surface 301b at three places in its circumferential direction (mount circumferential direction), lens side (accessory side) bayonet claws 301a. Moreover, the lens side mount 301 is provided with a lock hole portion 301c into which the lock pin 205 provided in the camera side mount 201 can be inserted; the lock hole portion 301c is formed so as to open at the mount base surface 301b. The lock hole portion 301c has, in the mount circumferential direction (that is, a relative rotation direction of the camera side and lens side mounts 201 and 301), an inner diameter that can engage with the lock pin 205 with almost no backlash, and has, in a radial direction (hereinafter referred to as "a mount radial direction") of the lens side mount 301, a longitudinal hole shape with an inner diameter larger than an outer diameter of the lock pin 205 to some degree. The longitudinal hole shape is provided in order to enable smooth insertion of the lock pin 205 into the lock hole portion 301c when the interchangeable lens 100 is attached to (relatively rotated with respect to) the camera 10.

In a partial area further inside than the bayonet claws 201a of the camera side mount 201, a camera side contact base (camera side contact holding portion) 202 that holds nine camera side contact pins $202a_1$, $202a_2$, ..., $202a_9$ arranged in the mount circumferential direction is formed. The camera side contact pins $202a_1$ to $202a_9$ are inserted into pin holding hole portions formed in the camera side contact base 202 so as to independently protrude forward and retract rearward (that is, so as to be independently movable in protruding and retracting directions). At bottoms of the pin holding hole portions, a flexible printed wiring board 206 is disposed. Moreover, a contact spring ($202b_1$, $202b_2$, ..., $202b_9$) is disposed between the flexible printed wiring board 206 and a flange portion of each camera side contact pin ($202a_1$, $202a_2$, ..., $202a_9$); the contact spring biases the camera side contact pin so as to protrude it forward from the camera side contact base 202.

The camera side contact pins $202a_1$ to $202a_9$ are, in this order, connected with the DTEF terminal, the DGND terminal, the LCLK terminal, the DLC terminal, the DCL terminal, the PGND terminal, the VBAT terminal, the VDD terminal and the MIF terminal, described in FIG. 1B. The camera side contact pin $202a_2$ corresponds to a fifth camera side contact pin, the camera side contact pins $202a_4$ and $202a_5$ each correspond to an eighth camera side contact pin, the camera side contact pin $202a_5$ corresponds to a seventh camera side contact pin and the camera side contact pin $202a_8$ correspond to a fourth camera side contact pin.

The camera side contact base 202, the camera side contact pins $202a_n$ (n=1 to 9 and the same applies to the following description) and the contact springs $202b_n$ and the flexible printed wiring board 206 constitute the camera side connector.

In a partial area further inside than the bayonet claws 301a of the lens side mount 301, a lens side contact base (lens side contact holding portion) 302 that holds nine rectangular lens side contact patterns $302a_1$, $302a_2$, ..., $302a_9$ arranged in the mount circumferential direction is formed. The lens side contact pattern may have another shape than a rectangular shape, such as a circular shape.

The lens side contact patterns $302a_1$ to $302a_9$ are connected with the lens controller 103 shown in FIG. 1B via a flexible printed wiring board 306. In portions of the lens side contact base 302 adjacent to pattern holding portions that respectively hold the lens side contact patterns $302a_1$ to $302a_9$, recessed (concave) portions 302z that recess forward further than the pattern holding portions. Moreover, a slope 302w is formed between each pattern holding portion and each recessed portion 302z adjacent thereto. In the following description, the pattern holding portions in the lens side contact base 302 and the lens side contact patterns $302a_1$ to $302a_9$ are collectively referred to as "the lens side contact base 302".

The lens side contact patterns $302a_1$ to $302a_9$ correspond, in this order, to the camera side contact pins $202a_1$ to $202a_9$ connected with the DTEF terminal, the DGND terminal, the LCLK terminal, the DLC terminal, the DCL terminal, the PGND terminal, the VBAT terminal, the VDD terminal and the MIF terminal. The lens side contact pattern $302a_2$ corresponds to a fifth accessory side contact surface, the lens side contact patterns $302a_4$ and $302a_5$ each correspond to an eighth accessory side contact surface, the lens side contact pattern $302a_5$ corresponds to a seventh accessory side contact surface and the lens side contact pattern $302a_8$ correspond to a fourth accessory side contact surface.

The lens side contact base 302 (including the recessed portion 302z and the slope 302w), the lens side contact patterns $302a_n$ (n=1 to 9 and the same applies to the following description) and the flexible printed wiring board 306 constitute the lens side connector.

The camera side contact pin $202a_n$ and the lens side contact pattern $302a_n$ are arranged at positions at which they make a pair with each other (that is, positions at which they make contact with each other) in the coupling completion state of the camera 10 and the interchangeable lens 100. At a time of the lens attachment, the lens side contact base 302 (including the lens side contact pattern $302a_n$ as mentioned above) coming in contact with the camera side contact pin $202a_n$ pushes this camera side contact pin $202a_n$ into the camera side contact base 202 with charging the contact spring $202b_n$. As a result, the camera side contact pin $202a_n$ makes contact with the corresponding (paired) lens side contact pattern $302a_n$ with pressure, and thereby electrical connection between the camera 10 and the interchangeable lens 100 is established.

Description will be made of the detection of the attachment of the interchangeable lens (first and second interchangeable lenses) 100 to the camera 10. The MIF_IN terminal of the camera microcomputer 90 is pulled up to the source voltage by a resistance R2 (for example, 100KΩ) provided in the camera controller 18 and thereby becomes H (High) when the interchangeable lens 100 is not attached to the camera 10. On the other hand, the MIF_IN terminal is connected with the ground (GND) in the interchangeable lens 100 when the interchangeable lens (first and second interchangeable lenses) 100 is attached to the camera 10, and thereby becomes L (low) at a point of time when the attachment of the interchangeable lens 100 is made, irrespective of the type of the attached interchangeable lens 100.

Figure 2A:
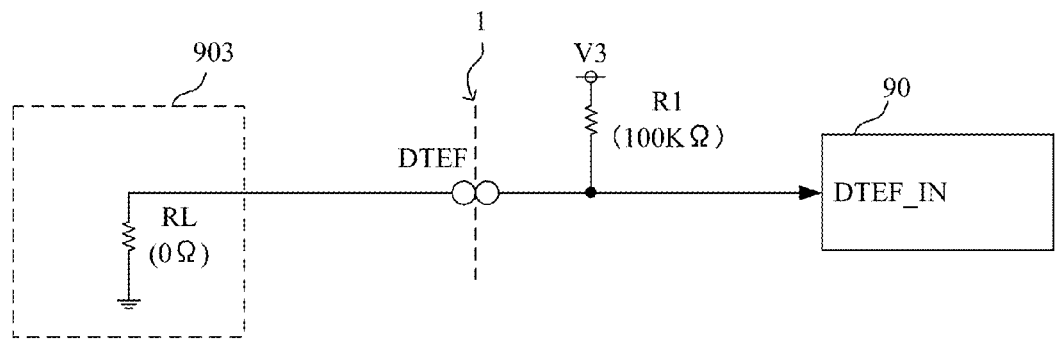
FIGS. 2A and 2B are block diagrams showing connection of lens type determining devices provided in first and second interchangeable lenses with a camera microcomputer in Embodiment 1.
Figure 2B:
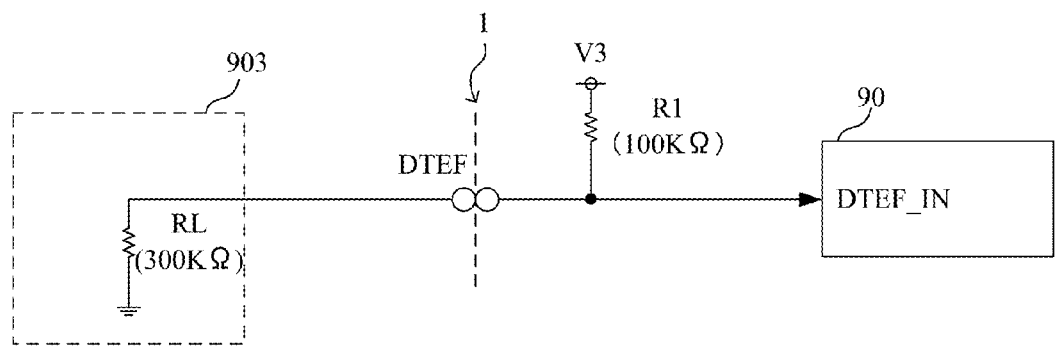

Description will be made of an exemplary configuration of the lens type determining device 903 provided in the lens controller 103 with reference to FIGS. 2A and 2B. The lens type determining device 903 is constituted by a resistance RL as a second resistance provided between the DTEF terminal in the mount 1 and the GND. A resistance value of the resistance RL is preset to a predetermined value corresponding (assigned) to the type of the interchangeable lens. For example, the resistance value of the resistance RL provided in the first interchangeable lens shown in FIG. 2A is set to 0Ω, and that of the resistance RL provided in the second interchangeable lens shown in FIG. 2B is set to 300KΩ.

In the camera 10, a resistance R1 (for example, 100KΩ) as a first resistance is connected between the DTEF terminal in the mount 1 (in other words, a first lens side terminal provided in a lens side mount) and the voltage (V3) of the operating source power for the camera microcomputer 90 to pull up the DTEF terminal to that operating source voltage (V3). The DTEF terminal is connected with the DTEF_IN terminal of the camera microcomputer 90. The DTEF_IN terminal of the camera microcomputer 90 is provided with an AD conversion function (10 Bit AD conversion function in this embodiment).

Description will be made of a lens type determination operation (hereinafter also referred to as "lens type determination") of the camera microcomputer 90 for determining the type of the interchangeable lens 100 attached to the camera 10. The camera microcomputer 90 performs the lens type determination on the basis of the voltage value input to the DTEF_IN terminal. Specifically, the camera microcomputer 90 performs AD conversion of the input voltage value and performs the lens type determination by comparing the AD converted value with lens type determination references stored in the camera microcomputer 90.

For example, when the first interchangeable lens is attached to the camera 10, the AD converted value of the voltage value input to the DTEF_IN terminal is decided, by a resistance ratio RL/(R1+RL) where R1 is 100KΩ and RL is 0Ω, as approximately "0x0000". The camera microcomputer 90 detects that the AD converted value obtained from the DTEF_IN terminal is within a range of "0x0000 to 0x007F", which is a first lens type determination reference, and thereby determines that the attached interchangeable lens is the first interchangeable lens.

On the other hand, when the second interchangeable lens is attached to the camera 10, the AD converted value of the voltage value input to the DTEF_IN terminal is decided, by the resistance ratio RL/(R1+RL) where R1 is 100KΩ and RL is 300Ω, as approximately "0x02FF". The camera microcomputer 90 detects that the AD converted value obtained from the DTEF_IN terminal is within a range of "0x0280 to 0x037F", which is a second lens type determination reference, and thereby determines that the attached interchangeable lens is the second interchangeable lens.

Although the above description was made of the case where the resistance value of the resistance RL of the first interchangeable lens is 0Ω by using a 0Ω resistance, a configuration may be employed which connects the DTEF terminal with the GND in the first interchangeable lens. Moreover, the value of the resistance RL may be produced by using a linear region of a switching element such as a transistor or by using a substrate pattern.

Figure 3:
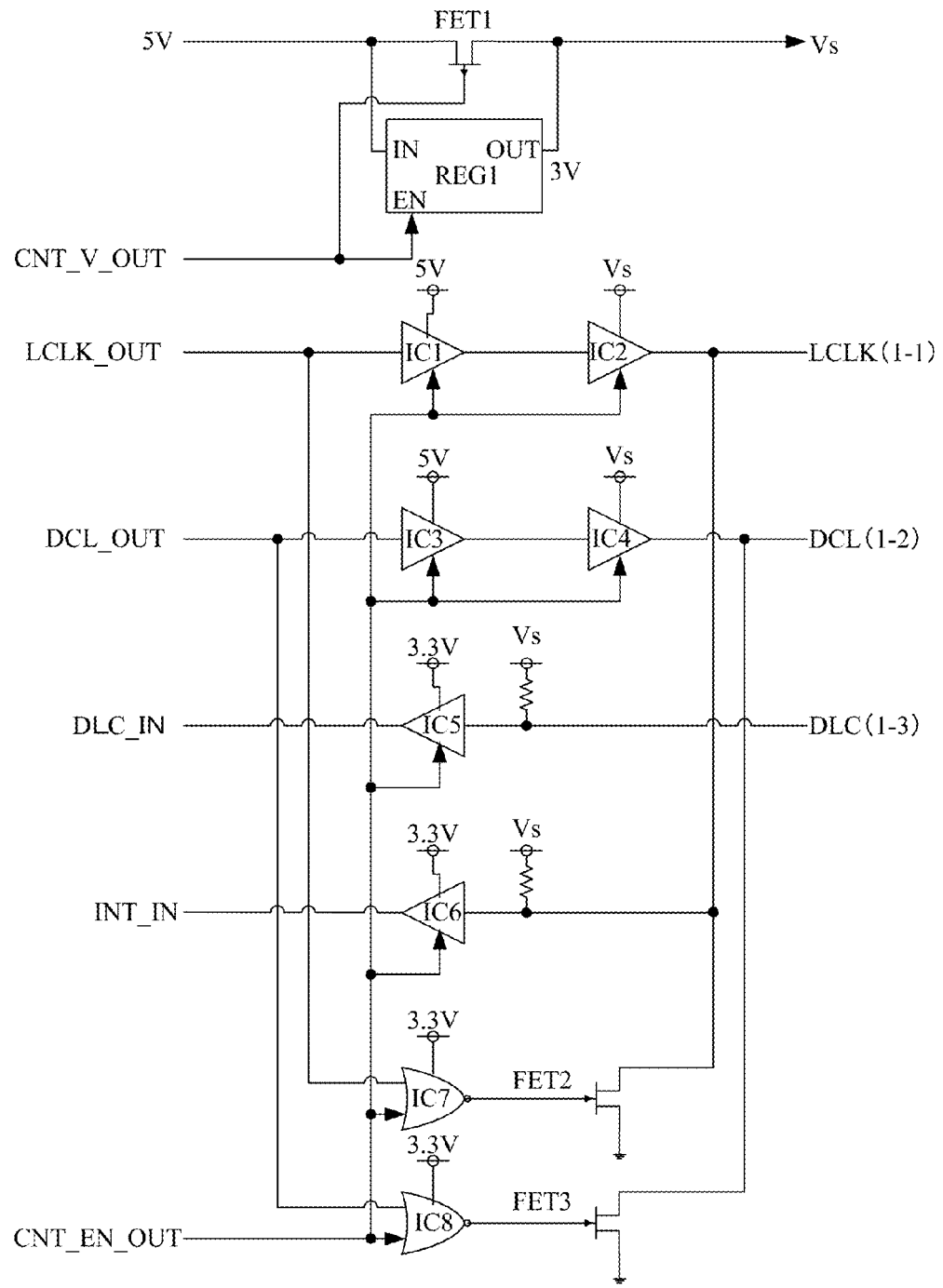
FIG. 3 is a block diagram showing a configuration of a voltage converter in Embodiment 1.

Next, description will be made of a voltage switching operation of the voltage converter 93 in the camera controller 18 with reference to FIG. 3. In FIG. 3, an FET1 is a PchFET whose source terminal is connected with 5V output from the camera power source 91, whose gate terminal is connected with the CNT_V_OUT terminal and whose drain terminal is wired-connected with an output terminal of an REG1 described later.

The REG1 is a series regulator that outputs 3V, whose input (IN) terminal is connected with 5V and whose output (OUT) terminal has a reverse voltage resistance of about 5V and is wired-connected with the drain terminal of the FET1. An output of wired-OR of an output from the FET1 and an output from the REG1 is used as a voltage $V_s$. An EN terminal (which becomes active by input of H) is connected with the CNT_V_OUT terminal. In other words, when the CNT_V_OUT terminal is L, the FET1 is turned on, the REG1 is turned off and thereby the $V_s$ becomes 5V. On the other hand, when the CNT_V_OUT terminal is H, the FET1 is turned off, the REG1 is turned on and thereby the $V_s$ becomes 3V. The FET1 and REG1 constitute a voltage selecting device.

Description will be made of an LCLK line. An IC1 and an IC2 are each a three state buffer. The IC1 is a TTL-level input buffer. A power source terminal of the IC1 is connected with 5V, and an input terminal thereof is connected with the LCLK_OUT terminal of the camera microcomputer 90. Moreover, an EN terminal of the IC1 is connected with the CNT_EN_OUT terminal of the camera microcomputer 90, and an output terminal thereof is connected with an input terminal of the IC2. The IC1 corresponds to a first voltage converter.

The IC2 is a CMOS-level input buffer and is provided with an input tolerant function allowing an input voltage up to about 5.5V. A power supply terminal of the IC2 is connected with the $V_s$, and the input terminal thereof is connected with the output terminal of the IC1. Moreover, an EN terminal of the IC2 is connected with the terminal CNT_EN_OUT of the camera microcomputer 90, and an output terminal thereof is connected with the LCLK terminal of the camera side mount. The IC2 corresponds to a second voltage converter.

The communication clock signal output by the camera microcomputer 90 is decided depending on the operation source voltage of the camera microcomputer 90, and thereby has an amplitude of 3.3V. The IC1 as the TTL level input buffer detects 3.3V as an H input and outputs, to the IC2, a voltage with an amplitude of 5V corresponding to the source voltage of the IC1. The IC2 detects 5V as an H input, outputs a voltage with an amplitude of 5V when the $V_s$ is 5V, and outputs a voltage with an amplitude of 3V when the $V_s$ is 3V. The IC2 can receive the 5V output from the IC1 by its input tolerant function. Thus, switching of the $V_s$ changes the output voltage of the communication clock signal.

In addition, an IC6, an IC7 and an FET2 are connected in parallel with the LCLK line. The IC6 is a three state buffer. The IC6 is a CMOS level input buffer and is provided with an input tolerant function allowing an input voltage up to about 5.5V. An input terminal of the IC6 is connected with the above-mentioned interrupt signal from the lens microcomputer 901, and an output terminal thereof is connected with the INT_IN terminal of the camera microcomputer 90. The IC6 converts the interrupt signal from the lens microcomputer 901 into 3.3 V that is the operation source voltage of the camera microcomputer 90 to output it to the INT_IN terminal of the camera microcomputer 90.

The IC7 has a NOR logic gate. An input-A terminal of the IC 7 is connected with the communication clock signal, and an input-B terminal thereof is connected with the CNT_EN_OUT terminal. When the CNT_EN_OUT terminal is L and the LCLK_OUT terminal is also L, the FET2 is turned on, and thereby the LCLK terminal (1-1) becomes L.

The FET2 is a PchFET and is used for the open drain communication when the first interchangeable lens is attached to the camera 10. When the CNT_EN_OUT terminal is H, the IC1 and IC2 become active and the IC6 and IC7 become inactive (HiZ), thereby enabling the CMOS communication. On the other hand, when the CNT_EN_OUT terminal is L, the IC1 and IC2 become inactive (HiZ) and the IC6 and IC7 become active, thereby enabling the open drain communication. Such operation makes it possible to input the interrupt signal output by the lens microcomputer 901 to the camera microcomputer 90 in the communication period allowing the input/output of the interrupt signal.

Next, description will be made of a DCL line. An IC3 and an IC4 are each a three state buffer. The IC3 is a TTL level input buffer. A power supply terminal of the IC3 is connected with 5V, and an input terminal thereof is connected with the DCL_OUT terminal of the camera microcomputer 90. Moreover, an EN terminal of the IC3 is connected with the CNT_EN_OUT terminal, and an output terminal thereof is connected with an input terminal of the IC4. The IC3 corresponds to a first voltage converter.

The IC4 is a CMOS level input buffer and is provided with an input tolerant function allowing an input voltage up to about 5.5V. A power source terminal of the IC4 is connected with the $V_s$, and an input terminal thereof is connected with the output terminal of the IC3. Moreover, an EN terminal of the IC4 is connected with the CNT_EN_OUT terminal, and an output terminal thereof is connected with the DCL terminal of the lens side mount. The IC4 corresponds to a second voltage converter.

The communication data output by the camera microcomputer 90 is decided depending on the operation source voltage of the camera microcomputer 90, and thereby has an amplitude of 3.3V. The IC3 as the TTL level input buffer detects 3.3V as an H input and outputs, to the IC4, a voltage with an amplitude of 5V corresponding to the source voltage of the IC3. The IC4 detects 5V as an H input, outputs a voltage with an amplitude of 5V when the $V_s$ is 5V, and outputs a voltage with an amplitude of 3V when the $V_s$ is 3V. The IC4 can receive the 5V output from the IC3 by its input tolerant function. Thus, switching of the $V_s$ changes the output voltage of the communication data.

In addition, an IC8 and an FET3 are connected in parallel with the DCL line. The IC8 has a NOR logic gate. An input-A terminal of the IC 8 is connected with the DCL_OUT terminal, and an input-B terminal thereof is connected with the CNT_EN_OUT terminal. Thus, when the CNT_EN_OUT terminal is L and the DCL_OUT terminal is also L, the FET3 is turned on, and thereby the DCL terminal (1-2) becomes L.

The FET3 is a PchFET and is used for the open drain communication when the first interchangeable lens is attached to the camera 10. When the CNT_EN_OUT terminal is H, the IC3 and IC4 become active and the IC8 becomes inactive (HiZ), thereby enabling the CMOS communication. On the other hand, when the CNT_EN_OUT terminal is L, the IC3 and IC4 become inactive (HiZ) and the IC8 becomes active, thereby enabling the open drain communication.

An IC5 is connected in series with the DLC line. The IC5 is a buffer. The IC5 is a CMOS level input buffer and is provided with an input tolerant function allowing an input voltage up to about 5.5V. A power source terminal of the IC5 is connected with the 3.3V, and an input terminal thereof is connected with the DLC terminal of the lens side mount. Moreover, an output terminal of the IC5 is connected with the DLC_IN terminal of the camera microcomputer 90.

The DLC_OUT terminal of the lens microcomputer 901 in the first interchangeable lens outputs a voltage with an amplitude of 5V, and on the other hand the DLC_OUT terminal of the lens microcomputer 901 in the second interchangeable lens outputs a voltage with an amplitude of 3V. However, when any of these interchangeable lenses is attached to the camera 10, the IC5 converts the above voltage output from the DLC_OUT terminal of the lens microcomputer 901 into a voltage with an amplitude of 3.3V and then inputs it to the DLC_IN terminal of the camera microcomputer 90.

The camera microcomputer 90 controls the CNT_V_OUT terminal according to a logic table shown in Table 1.

TABLE 1

| LENS ATTACHED | FIRST INTERCHANGEABLE LENS | SECOND | RESERVED | NON-COMPLIANT LENS |
|---|---|---|---|---|
| DTEF_IN | 0x0000~0x007F | 0x0280~0x037F | 0x0080~0x027F | 0x0380~0x03FF |
| CNT_V_OUT | H | L | — | — |
| COMMUNICATION VOLTAGE | 5 V | 3 V | — | — |

TABLE 1-continued

| LENS ATTACHED | FIRST INTERCHANGEABLE LENS | | SECOND RESERVED | | NON-COMPLIANT LENS |
|---|---|---|---|---|---|
| CNT_EN_OUT | H | L | H | — | — |
| COMMUNICATION METHOD | CMOS | OPEN DRAIN | CMOS | NO COMMUNICATION | |

As described above, the camera microcomputer 90 determines the type of the attached interchangeable lens 100 on the basis of the voltage value (AD converted value) input to the DTEF_IN terminal. Then, the camera microcomputer 90 controls a logic signal output from the CNT_V_OUT terminal depending on a result of the lens type determination of the attached interchangeable lens 100. Specifically, when determining from the voltage value of the DTEF_IN terminal that the attached interchangeable lens 100 is the first interchangeable lens, the camera microcomputer 90 outputs H from the CNT_V_OUT terminal to control the communication voltage to the V1. On the other hand, when determining from the voltage value of the DTEF_IN terminal that the attached interchangeable lens 100 is the second interchangeable lens, the camera microcomputer 90 outputs L from the CNT_V_OUT terminal to control the communication voltage to the V2.

Moreover, when detecting, as the voltage value (AD converted value) of the DTEF_IN terminal, a voltage out of the range of the above-mentioned first and second lens type determination references, the camera microcomputer 90 determines that the attached interchangeable lens is "a non-compliant lens" to which the camera 10 is not compliant or reserves the determination because of being unable to make a normal lens type determination. In these cases, the camera microcomputer 90 does not perform communication with the attached interchangeable lens 100.

Figure 4:
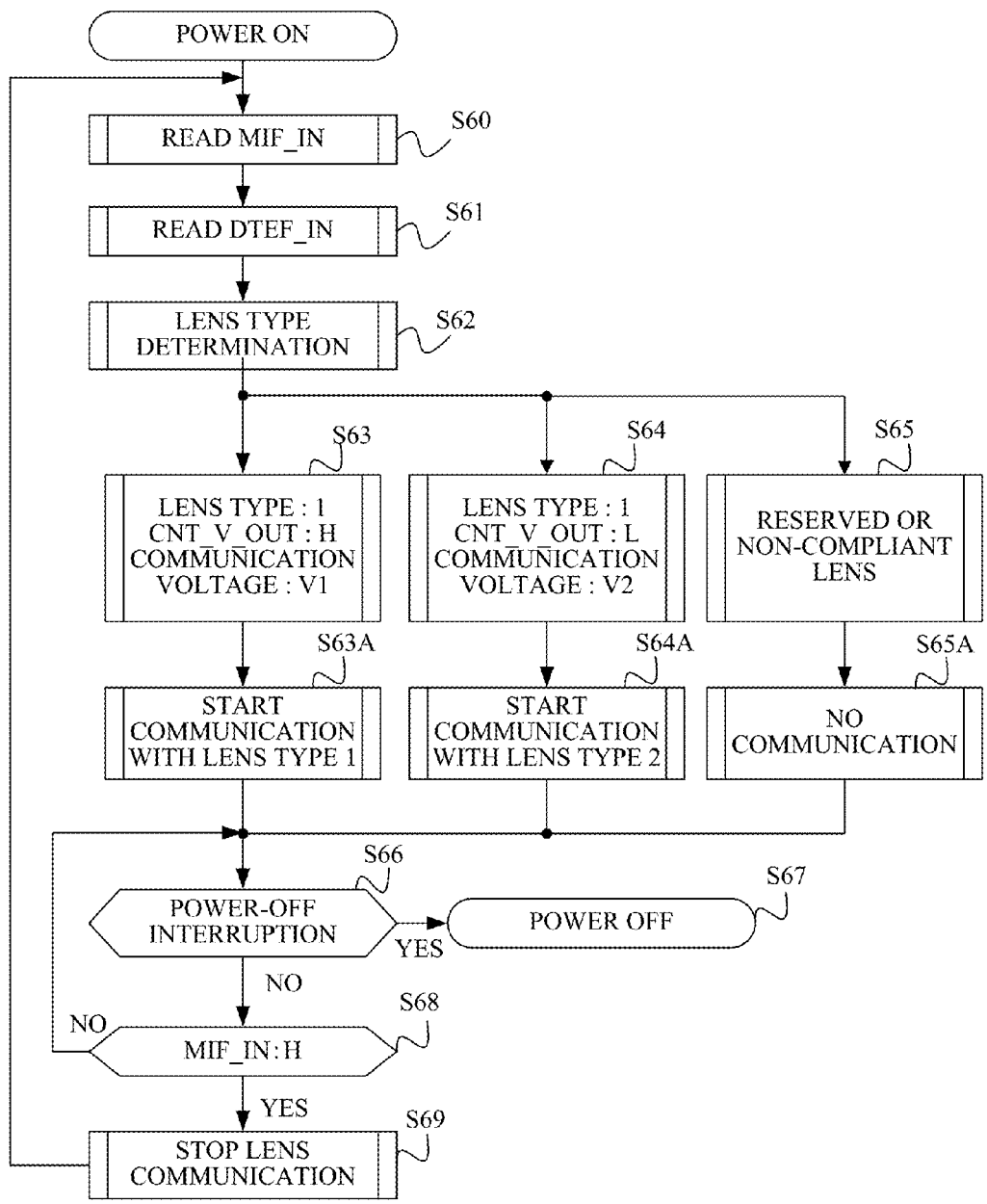
FIG. 4 is a flowchart showing a communication setting process in Embodiment 1.

A flowchart of FIG. 4 shows a communication setting operation performed by the camera microcomputer 90. The camera microcomputer 90 executes this operation according to a computer program stored in the memory 16.

At step S60, the camera microcomputer 90 reads the voltage value (H or L) from the MIF_IN terminal. Next, at step S61, the camera microcomputer 90 reads the voltage value from the DTEF_IN terminal. These steps S60 and S61 may be performed in this order, and may be performed simultaneously.

Next, at step S62, the camera microcomputer 90 determines the type of the interchangeable lens 100 attached to the camera 10 on the basis of the voltage value of the DTEF_IN terminal as described above. If determining that the attached interchangeable lens 100 is the first interchangeable lens (lens type 1), the camera microcomputer 90 outputs H from the CNT_V_OUT terminal to set the communication voltage V1 at step S63, and then proceeds to step S63A. On the other hand, if determining that the attached interchangeable lens 100 is the second interchangeable lens (lens type 2), the camera microcomputer 90 outputs L from the CNT_V_OUT terminal to set the communication voltage V2 at step S64, and then proceeds to step S64A. If determining that the attached interchangeable lens 100 is neither the first nor second interchangeable lens, the camera microcomputer 90 determines that the attached interchangeable lens 100 is "the non-compliant lens" or reserves the determination at step S65, and then proceeds to step S65A.

At steps S63A and S64A, the camera microcomputer 90 starts the communication with the attached interchangeable lens 100 with the set communication voltage. At step S65A, the camera microcomputer 90 does not start the communication with the attached interchangeable lens 100, but performs a warning process for informing a user.

Thereafter, at step S66, the camera microcomputer 90 determines whether or not a power-off interruption due to an off operation of the power switch 62 has been input. If the power-off interruption has been input, the camera microcomputer 90 performs a power-off process at step S67. On the other hand, if the power-off interruption has not been input, the camera microcomputer 90 proceeds to step S68 to determine whether or not H has been input from the MIF_IN terminal, that is, whether or not the interchangeable lens 100 has been detached from the camera 10. If H has been input from the MIF_IN terminal, the camera microcomputer 90 proceeds to step S69 to stop the communication with the interchangeable lens 100, and then returns to step S60. On the other hand, If H has not been input from the MIF_IN terminal, the camera microcomputer 90 returns to step S66.

Figure 5A:
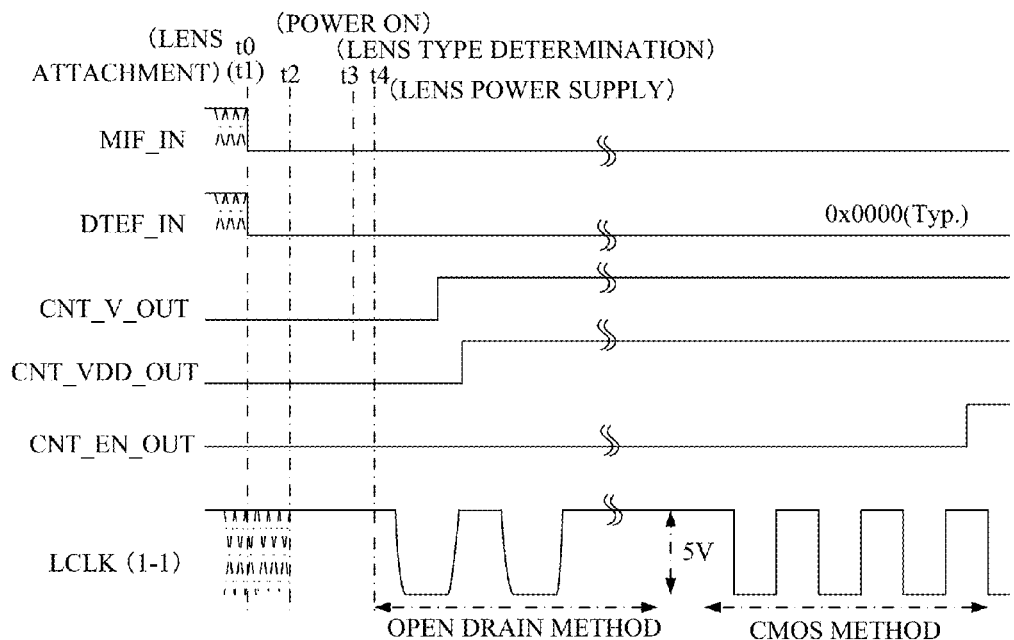
FIGS. 5A and 5B are timing charts showing examples of input and output timings of the camera microcomputer in Embodiment 1.
Figure 5B:
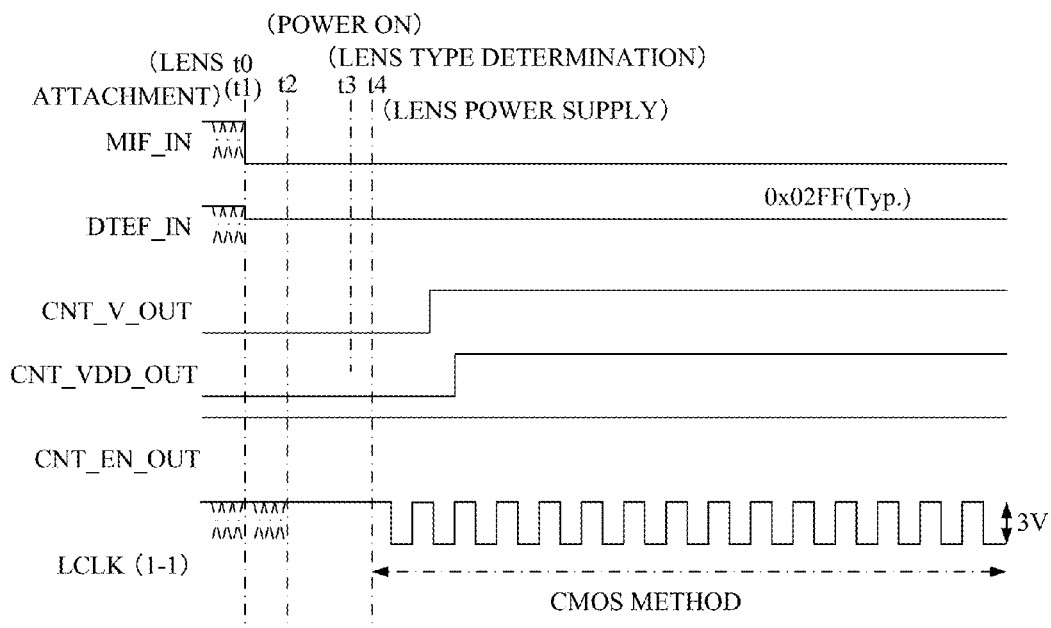

FIGS. 5A and 5B show exemplary input and output timings of the MIF_IN terminal, the DTEF_IN terminal, the CNT_V_OUT terminal, the CNT_VDD_OUT terminal of the camera microcomputer 90 and the LCLK terminal of the mount 1. FIG. 5A shows the input and output timings when the first interchangeable lens is attached to the camera 10, and FIG. 5B shows the input and output timings when the second interchangeable lens is attached to the camera 10. In these figures, t0 represents a time at which voltage input to the DTEF_IN terminal is made during a process of attachment of the interchangeable lens 100 to the camera 10 (hereinafter referred to as "a lens attachment process"), and t1 represents a time at which voltage input to the MIF_IN terminal is made during the lens attachment process. Moreover, t2 represents a time at which the camera 10 is activated (power is turned on), t3 represents a time at which the lens type determination and the communication voltage setting are made, and t4 represents a time at which the power supply to the attached interchangeable lens 100 and the communication therewith are started.

Although FIGS. 5A and 5B show the case where the time t0 is identical to the time t1, the time t1 may be later than the time t0. When a time at which contacts for the DTEF terminal in the mount 1 (camera side and lens side mounts) make contact is earlier than a time at which contacts for the MIF terminal make contact, the time t0 is earlier than the time t1. When these times at which the contacts make contact are identical to each other, the time t0 is identical to the time t1.

When any of the first and second interchangeable lenses is attached to the camera 10, the voltage input to the MIF_IN terminal is made (t1) simultaneously with (or after) the voltage input to the DTEF_IN terminal is made (t0). Then, after the camera is activated (t2), the lens type determination and the communication voltage setting depending on the result of the lens type determination are made (t3), and thereafter the power supply to the interchangeable lens 100 and the communication therewith are started (t4). In a case where the interchangeable lens is attached to the camera 10 after the camera 10 is activated, though the order of the times t1, t0 and t2 is reversed, the voltage input to the MIF_IN terminal is made simultaneously with (or after) the voltage input to the DTEF_IN terminal is made.

Although this embodiment described the case where the voltage V1 is 5V, the voltage V2 is 3V, the voltage V3 is 3.3V and the voltage VM is 4.8V, these voltages are merely examples, and the voltages V1, V2, V3 and VM may be set to other voltages. Although the voltage V1 is different from the voltage V2, the voltage V1 may be same as the voltage V3 or VM, and the voltage V2 may be same as V3 or VM. In other word, it is only necessary that the voltage V3 is different from at least one of the voltages V1 and V2. Moreover, although this embodiment described the case of using the buffer as the voltage converter converting (changing) the communication voltage, the voltage converter is not limited thereto, and other communication voltage conversion methods may be employed. For example, the communication voltage conversion may be performed by setting the communication method to the open drain method and switching the source voltage for signal pull-up.

In addition, although this embodiment described, as the method for producing the voltage of the DTEF terminal corresponding to the lens type, the resistance voltage division using the resistances R1 and RL, other methods may be employed. For example, a method may be employed which provides, to the interchangeable lens, a reference power source circuit (device) constituted by a DC-DC converter, a series regulator, a diode or the like. Specifically, a case of providing the series regulator in the second interchangeable lens is as follows. In this case, an input voltage of the series regulator is set to the fourth voltage (VDD) supplied from the camera 10 to the interchangeable lens 100. Moreover, an output voltage of the series regulator (that is, a predetermined voltage output to the first lens side terminal) is set to a voltage at which the AD converted value of the DTEF terminal falls within the range of the second lens type determination reference "0x0280 to 0x037F", that is, to a voltage assigned to the second interchangeable lens. Therefore, the camera microcomputer 90 detecting that the AD converted value of the DTEF terminal is within the range of the second lens type determination reference "0x0280-0x037F" can determine that the attached interchangeable lens is the second interchangeable lens.

Embodiment 2

Figure 6:
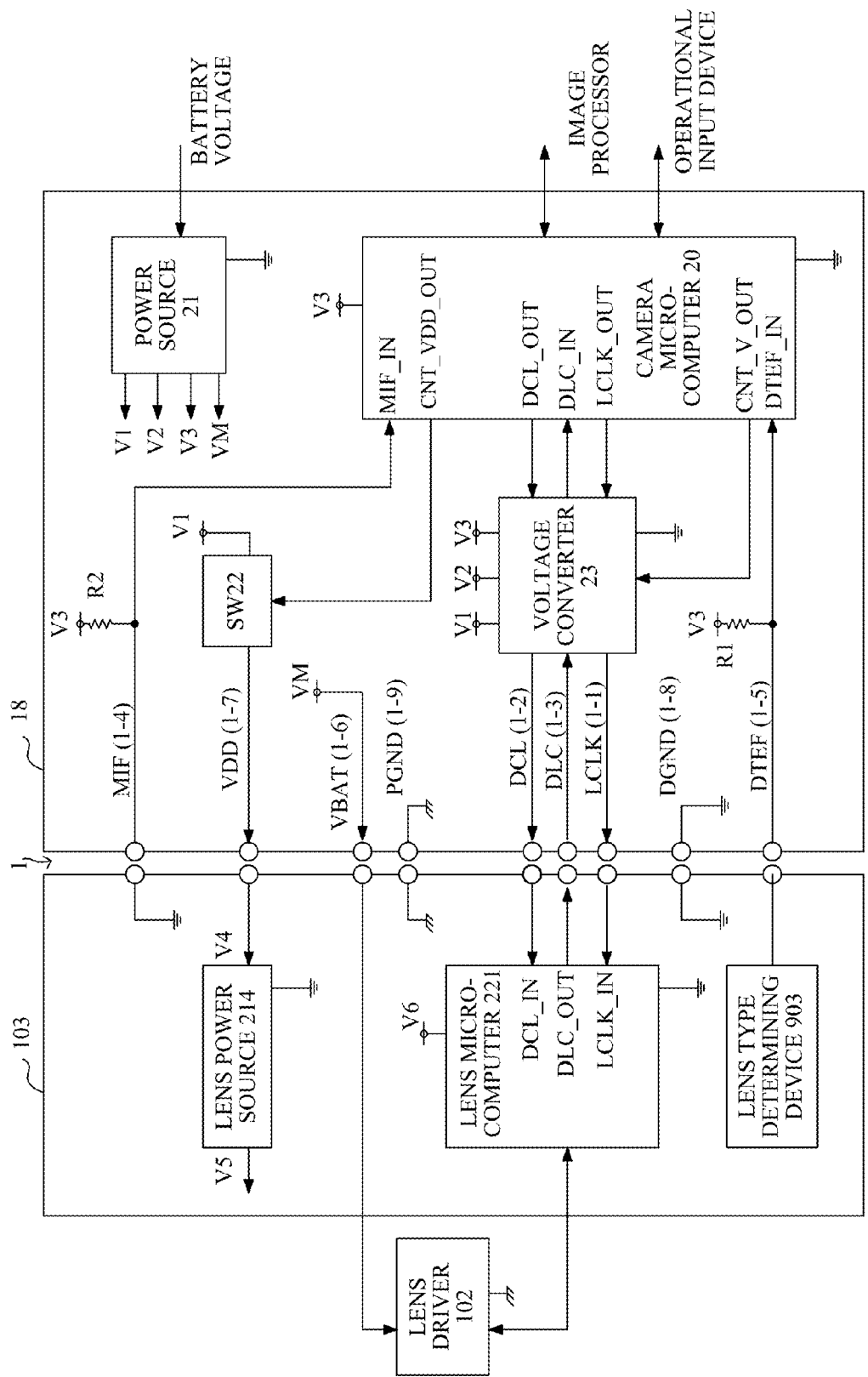
FIG. 6 is a block diagram showing configurations of a camera controller and a lens controller of a camera and an interchangeable lens that are Embodiment 2 of the present invention.

Next, description will be made of a second embodiment (Embodiment 2) of the present invention with reference to FIGS. 6, 7, 8A and 8B. A basic configuration of a camera system including a camera and an interchangeable lens, which are Embodiment 2, is same as that shown in FIG. 1A in Embodiment 1. In this embodiment, the camera and the interchangeable lens are also denoted by reference numerals 10 and 100, respectively. However, as shown in FIG. 6, a camera microcomputer 20 and a lens microcomputer 221 of a second interchangeable lens in this embodiment are not provided with the INT_IN and INT_OUT terminals provided in the camera microcomputer 90 and the lens microcomputer 901 in Embodiment 1 for inputting the interrupt signal from the lens microcomputer 901 to the camera microcomputer 90. Moreover, the camera microcomputer 20 in this embodiment is not provided with the CNT_EN_OUT terminal provided in the camera microcomputer 90 in Embodiment 1 for outputting the switching signal to switch the communication method with the interchangeable lens. Elements and terminals in a camera controller 18, the camera microcomputer 20, a lens controller 103 and the lens microcomputer 221 in this embodiment common to those in Embodiment 1 are denoted by same reference numerals and characters as those in Embodiment 1.

A camera power supply 21 provided in the camera controller 18 converts a battery voltage supplied from a battery (not shown) included in the camera 10 into voltages necessary for operations of respective circuits in the camera 10. Specifically, the camera power supply 21 produces voltages V1, V2, V3 and VM.

The voltage (first voltage) V1 is a voltage as communication controlling source power (VDD) of the interchangeable lens (first and second interchangeable lenses) 100 and a communication voltage of the first interchangeable lens. The voltage (second voltage) V2 is a communication voltage of the second interchangeable lens. The voltage (third voltage) V3 is a voltage as operating source power of the camera microcomputer 20. The voltage VM is a voltage as driving source power of actuators provided in the first and second interchangeable lenses. Although the voltage V1 is different from the voltage V2, the voltage V1 may be same as the voltage V3 or VM, and the voltage V2 may be same as the voltage V3 or VM (or may be different from both the voltages V3 and VM).

In response to turn-on of the power switch 22, the camera microcomputer 20 starts supply of the VDD and VM from the camera 10 to the interchangeable lens 100. In response to turn-off of the power switch 22, the camera microcomputer 20 ends the supply of the VDD and VM from the camera 10 to the interchangeable lens 100.

Figure 7:
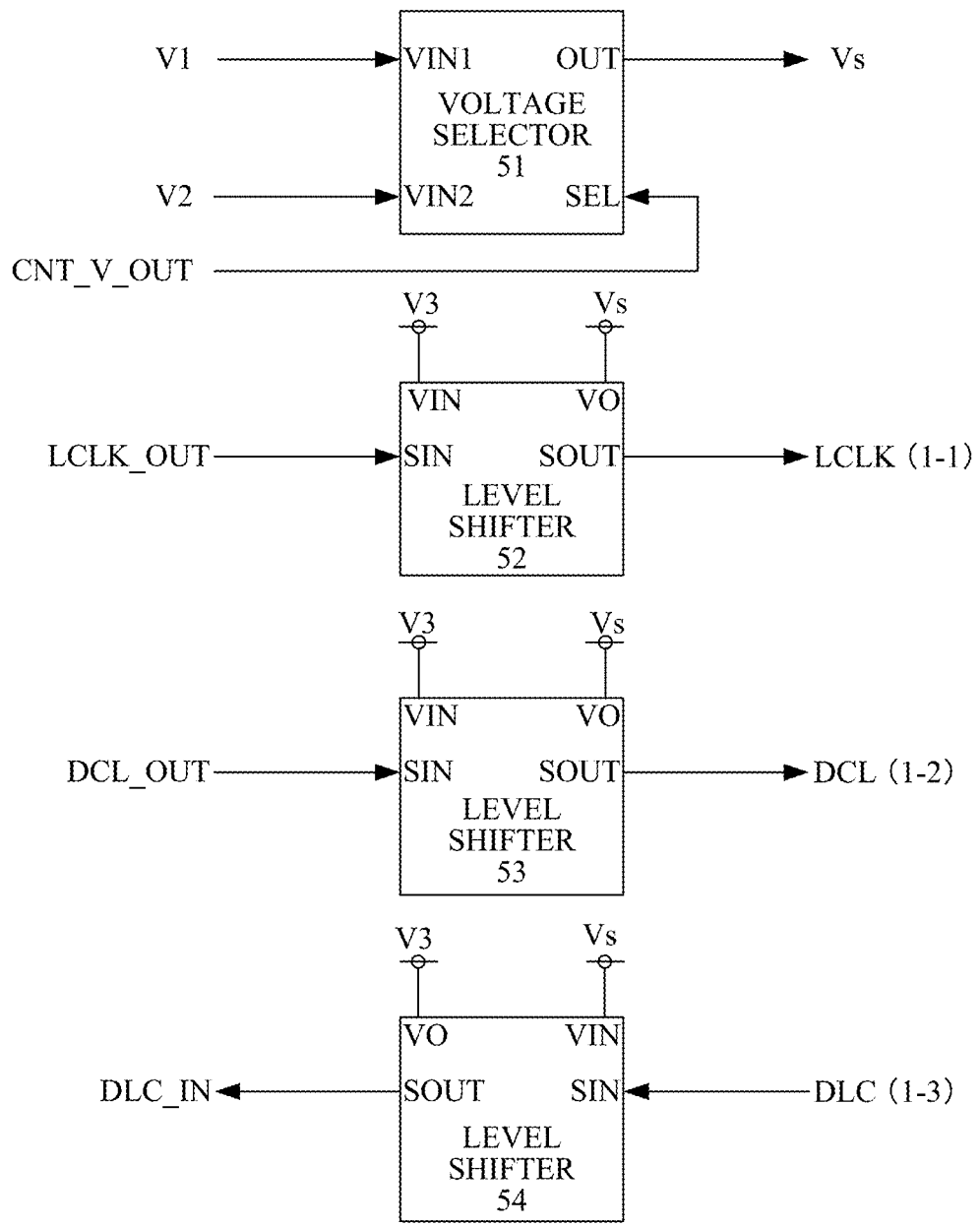
FIG. 7 is a circuit diagram showing a configuration of a voltage converter in Embodiment 2.

FIG. 7 shows an exemplary configuration of a voltage converter 23. A voltage selector 51 has a function of outputting, to an OUT terminal, any one of two voltages input to a VIN1 terminal and a VIN2 terminal according to a logic signal at an SEL terminal. Specifically, the voltage selector 51 outputs the voltage input to the VIN1 terminal when the input to the SEL terminal is L, and the voltage selector 51 outputs the voltage input to the VIN2 terminal when the input to the SEL terminal is H. The voltage V1 is connected to the VIN1 terminal, the voltage V2 is connected to the VIN2 terminal, and the CNT_V_OUT terminal of the camera microcomputer 20 is connected to the SEL terminal. The output of the OUT terminal is hereinafter referred to as "Vs".

Level shifters 52, 53 and 54 each have a function of converting a voltage of a signal input to an SIN terminal from a voltage of a VIN terminal into a voltage of a VOUT (VO in the figure) terminal and then outputting the converted voltage from an SOUT terminal.

In the level shifter 52, the SIN terminal is connected with the LCLK_OUT terminal of the camera microcomputer 20, and the SOUT terminal is connected with the LCLK terminal of the mount 1 of the camera 10 and the interchangeable lens 100. Moreover, the VIN terminal is connected with the V3 that is the same voltage as the operating source power voltage of the camera microcomputer 20, and the VOUT terminal is connected with the $V_s$ output from the voltage selector 51. In the level shifter 53, the SIN terminal is connected with the DCL_OUT terminal of the camera microcomputer 20, and the SOUT terminal is connected with the DCL terminal of the mount 1. Moreover, the VIN terminal is connected with the V3 that is the same voltage as the operating source power voltage of the camera microcomputer 20, and the VOUT terminal is connected with the $V_s$ output from the voltage selector 51. In the level shifter 54, the SIN terminal is connected with the DLC terminal of the mount 1, and the SOUT terminal is connected with the DLC_IN terminal of the camera microcomputer 20. Moreover, the VIN terminal is connected with the $V_s$ output from the voltage selector 51, and the VOUT terminal is connected with the V3 that is the same voltage as the operating source power voltage of the camera microcomputer 20. Thus, the $V_S$ (that is, V1 or V2) output from the voltage selector 51 is used as the communication voltage between the camera 10 and the interchangeable lens 100.

Description will be made of a voltage switching operation of the voltage converter 23. The camera microcomputer 20 controls the CNT_V_OUT terminal according to a logic table shown in Table 2.

TABLE 2

| LENS ATTACHED | FIRST INTERCHANGEABLE LENS | SECOND | RESERVED | NON-COMPLIANT LENS |
|---|---|---|---|---|
| DTEF_IN | 0x0000~0x007F | 0x0280~0x037F | 0x0080~0x027F | 0x0380~0x03FF |
| CNT_V_OUT | H | L | — | — |
| COMMUNICATION VOLTAGE | V1 | V2 | NO COMMUNICATION | |

As well as the camera microcomputer 90 in Embodiment 1, the camera microcomputer 20 determines the type of the attached interchangeable lens 100 on the basis of the voltage value (AD converted value) input to the DTEF_IN terminal. Then, the camera microcomputer 20 controls a logic signal output from the CNT_V_OUT terminal depending on a result of the lens type determination of the attached interchangeable lens 100. Specifically, when determining from the voltage value of the DTEF_IN terminal that the attached interchangeable lens 100 is the first interchangeable lens, the camera microcomputer 20 outputs H from the CNT_V_OUT terminal to control the communication voltage to the V1. On the other hand, when determining from the voltage value of the DTEF_IN terminal that the attached interchangeable lens 100 is the second interchangeable lens, the camera microcomputer 20 outputs L from the CNT_V_OUT terminal to control the communication voltage to the V2.

Moreover, when detecting, as the voltage value (AD converted value) of the DTEF_IN terminal, a voltage out of ranges of first and second lens type determination references, the camera microcomputer 20 determines that the attached interchangeable lens is "a non-compliant lens" to which the camera 10 is not compliant or reserves the determination because of being unable to make a normal lens type determination. In these cases, the camera microcomputer 20 does not perform communication with the attached interchangeable lens 100.

Figure 8A:
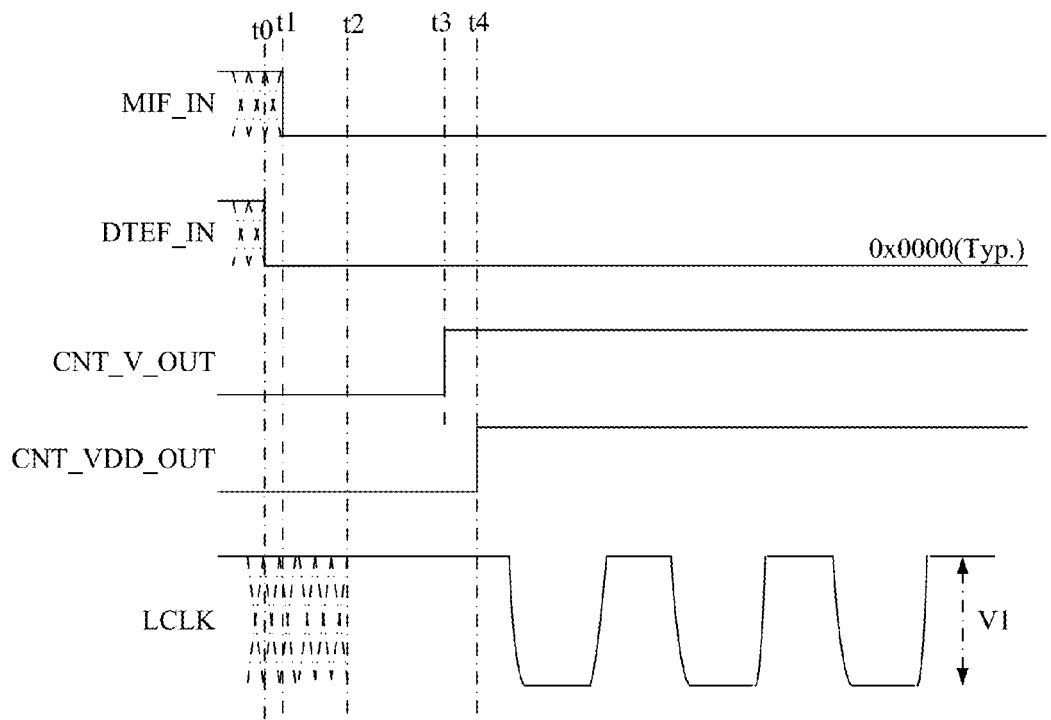
FIGS. 8A and 8B are timing charts showing examples of input and output timings of a camera microcomputer in Embodiment 2.
Figure 8B:
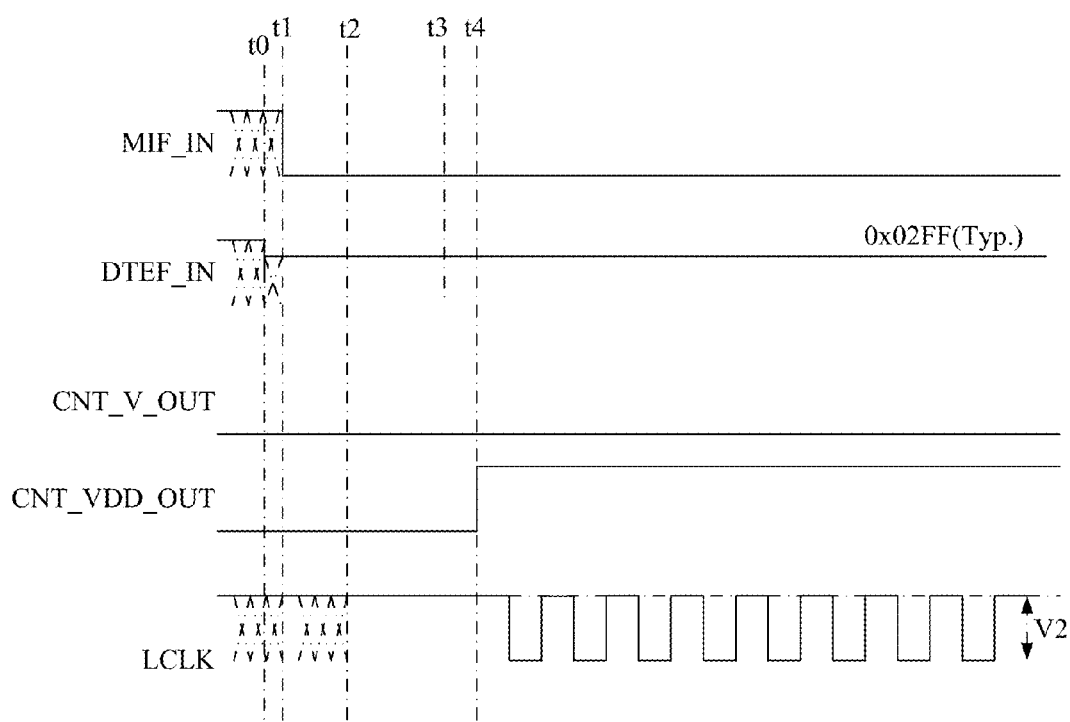

FIGS. 8A and 8B show exemplary input and output timings of the MIF_IN terminal, the DTEF_IN terminal, the CNT_V_OUT terminal, the CNT_VDD_OUT terminal of the camera microcomputer 20 and the LCLK terminal of the mount 1. FIG. 8A shows the input and output timings when the first interchangeable lens is attached to the camera 10, and FIG. 8B shows the input and output timings when the second interchangeable lens is attached to the camera 10. In these figures, t0 represents a time at which voltage input to the DTEF_IN terminal is made during a lens attachment process, and t1 represents a time at which voltage input to the MIF_IN terminal is made during the lens attachment process. Moreover, t2 represents a time at which the camera 10 is activated (power is turned on), t3 represents a time at which the lens type determination and the communication voltage setting are made, and t4 represents a time at which the power supply to the attached interchangeable lens 100 and the communication therewith are started. Although FIGS. 8A and 8B show the case where the time t0 is earlier than the time t1, the time t1 may be identical to the time t0. When a time at which contacts for the DTEF terminal in the mount 1 (camera side and lens side mounts) make contact is earlier than a time at which contacts for the MIF terminal make contact, the time t0 is earlier than the time t1. When these times at which the contacts make contact are identical to each other, the time t0 is identical to the time t1. In addition, although the times at which the voltage input to the DTEF_IN terminal and the voltage input to the MIF_IN terminal are made are respectively, as described above, t0 and t1, the camera microcomputer 20 reads the voltage value of the DTEF_IN terminal after the MIF_IN terminal becomes L.

In both the cases where the first interchangeable lens is attached to the camera 10 and where the second interchangeable lens is attached thereto, the voltage input to the MIF_IN terminal is made (t1) after (or simultaneously with) the voltage input to the DTEF_IN terminal (t0). Then, after the camera 10 is activated (t2), the lens type determination and the communication voltage setting depending on the result of the lens type determination are performed (t3). Thereafter, the power supply to the interchangeable lens 100 and the communication therewith are started (t4). When the interchangeable lens is attached to the camera 10 after the camera 10 is activated, though the time t2 is before the times t0 and t1, the voltage input to the MIF_IN terminal is performed after (or simultaneously with) the voltage input to the DTEF_IN terminal.

Embodiment 3

Figure 9A:
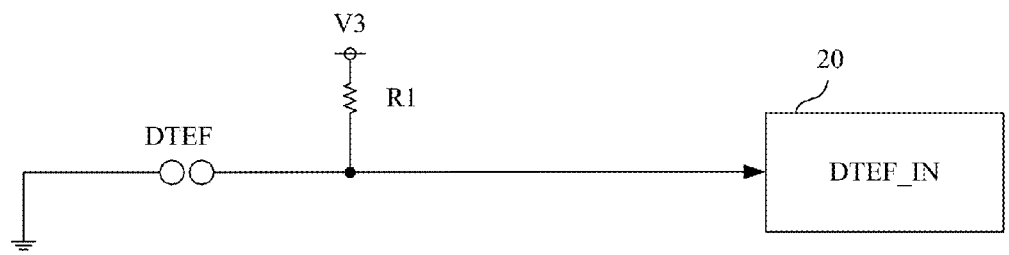
FIGS. 9A and 9B are block diagrams showing connection of lens type determining devices provided in first and second interchangeable lenses with a camera microcomputer in Embodiment 3 of the present invention.
Figure 9B:
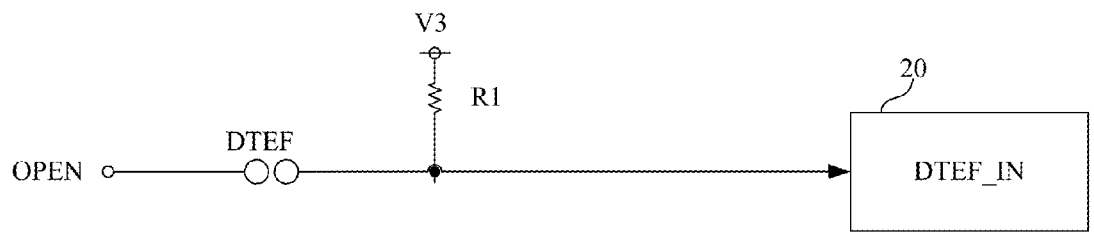

FIGS. 9A and 9B show an exemplary configuration of a lens type determining device provided in an interchangeable lens (first and second interchangeable lenses) that is a third embodiment (Embodiment 3) of the present invention. The lens type determining device is connected, through the DTEF terminal in the mount, with the DTEF_IN terminal of the camera microcomputer 20 shown in Embodiment 2. In the first interchangeable lens shown in FIG. 9A, the lens type determining device is directly connected with ground of the first interchangeable lens, without providing the 0Ω resistance RL shown in Embodiment 1 (FIG. 2A). In this case, the camera microcomputer 20 detects L through the DTEF_IN terminal. On the other hand, in the second interchangeable lens shown in FIG. 9B, the lens type determining device merely opens the DTEF terminal. In this case, the camera microcomputer 20 detects H through the DTEF_IN terminal because the DTEF_IN terminal is pulled up to the source voltage (V3) by a resistance R1 (for example, 100KΩ) as a first resistance.

Thus, the type of the interchangeable lens can be determined even without using the resistance ratio described in Embodiment 1.

According to each of the above-described embodiments, the camera to which the plurality of the interchangeable lenses (lens units) whose communication voltages are different from one another are interchangeably attached switches the communication voltage depending on the type of the attached interchangeable lens, without changing the source voltage to be supplied to the respective interchangeable lenses. Thereby, necessity of providing, to the camera, multiple power sources for supplying different powers to the respective interchangeable lenses can be eliminated. Moreover, even when the camera erroneously determines the type of the attached interchangeable lens, supply of a source voltage or current exceeding a rated one to the interchangeable lens can be prevented.

Furthermore, the present invention is not limited to these embodiments and various variations and modifications may be made without departing from the scope of the present invention.

This application claims the benefit of Japanese Patent Application Nos. 2013-049118, filed on Mar. 12, 2013, 2012-085426, 2012-085190 and 2012-085223 filed on Apr. 4, 2012 which are hereby incorporated by reference herein in their entirety.

What is claimed is:

1. A lens unit comprising:
    a mount to mechanically couple with an image pickup apparatus and to electrically connect the lens unit with the image pickup apparatus; and
    a lens controller configured to receive power supply at a fourth voltage from the image pickup apparatus, to produce from the fourth voltage a sixth voltage different from the fourth voltage, and to perform the communication with the image pickup apparatus with the sixth voltage,
    wherein the mount includes a first lens terminal enabling provision of a type of the lens unit by a configuration to output a predetermined voltage corresponding to the type of the lens unit in a state of being attached to the image pickup apparatus.

2. A lens unit according to claim 1, wherein the first lens terminal is connected with an element having a resistance value corresponding to the type of the lens unit.

3. A lens unit according to claim 2, wherein the element is a resistance having the resistance value corresponding to the type of the lens unit.

4. A lens unit according to claim 2, wherein the resistance value is produced by using a linear region of a switching element such as a transistor or by using a substrate pattern.

5. A lens unit according to claim 1, wherein the mount includes a second lens terminal for receiving the power supply at the fourth voltage from the image pickup apparatus.

6. A lens unit according to claim 5, wherein the mount includes a third lens terminal provided, along with the second lens terminal, for ground connection.

7. A lens unit according to claim 1, wherein the mount includes a fourth lens terminal for receiving, from the image pickup apparatus, a fifth voltage to be used for drive of an actuator provided in the lens unit.

8. A lens unit according to claim 7, wherein the mount includes a fifth lens terminal provided, along with the fourth lens terminal, for ground connection.

9. A lens unit according to claim 1, wherein the mount includes a sixth lens terminal for enabling the image pickup apparatus to detect attachment of the lens unit to the image pickup apparatus.

10. A lens unit according to claim 9, wherein, during a process of the attachment of the lens unit to the image pickup apparatus, electrical contact of the first lens terminal with a corresponding terminal provided in the image pickup apparatus is made earlier than electrical contact of the sixth lens terminal with another corresponding terminal provided in the image pickup apparatus.

11. A lens unit according to claim 1, wherein the mount includes a seventh lens terminal through which the lens controller performs the communication of data with the image pickup apparatus.

12. A lens unit comprising:
    a mount to mechanically couple with an image pickup apparatus and to electrically connect the lens unit with the image pickup apparatus; and
    a lens controller configured to receive a power voltage for power source from the image pickup apparatus, to produce from the power voltage a communication voltage different from the power voltage, and to perform the communication with the image pickup apparatus with the communication voltage,
    wherein the mount includes a first lens terminal enabling provision of a type of the lens unit by a configuration to output a predetermined voltage corresponding to the type of the lens unit in a state of being attached to the image pickup apparatus.

13. A lens unit according to claim 12, wherein the first lens terminal is connected with an element having a resistance value corresponding to the type of the lens unit.

14. A lens unit according to claim 13, wherein the element is a resistance having the resistance value corresponding to the type of the lens unit.

15. A lens unit according to claim 13, wherein the resistance value is produced by using a linear region of a switching element such as a transistor or by using a substrate pattern.

16. A lens unit according to claim 12, wherein the mount includes a second lens terminal for receiving the power voltage for the lens controller from the image pickup apparatus.

17. A lens unit according to claim 16, wherein the mount includes a third lens terminal provided, along with the second lens terminal, for ground connection.

18. A lens unit according to claim 12, wherein the mount includes a fourth lens terminal for receiving, from the image pickup apparatus, a voltage to be used for drive of an actuator provided in the lens unit.

19. A lens unit according to claim 18, wherein the mount includes a fifth lens terminal provided, along with the fourth lens terminal, for ground connection.

20. A lens unit according to claim 12, wherein the mount includes a sixth lens terminal for enabling the image pickup apparatus to detect attachment of the lens unit to the image pickup apparatus.

21. A lens unit according to claim 20, wherein, during a process of the attachment of the lens unit to the image pickup apparatus, electrical contact of the first lens terminal with a corresponding terminal provided in the image pickup apparatus is made earlier than electrical contact of the sixth lens terminal with another corresponding terminal provided in the image pickup apparatus.

22. A lens unit according to claim 12, wherein the mount includes a seventh lens terminal through which the lens controller performs the communication of data with the image pickup apparatus.

* * * * *